United States Patent
Farrar et al.

(10) Patent No.: US 12,301,646 B2
(45) Date of Patent: *May 13, 2025

(54) TRANSMITTING DATA USING AUDIO TRANSMISSIONS AND QUADRATURE AMPLITUDE MODULATION AND ASSOCIATED EQUALIZATION STRATEGIES

(71) Applicant: LISNR, Inc., Cincinnati, OH (US)

(72) Inventors: Rebekah Farrar, Columbus, OH (US); Oz Mendel, Piedmont, CA (US); William Knauer, Bellevue, KY (US); Samuel Banzhaf, Cincinnati, OH (US); Ethan Tyink, New Palestine, IN (US); Timothy Minear, Athens, OH (US)

(73) Assignee: LISNR, INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,863

(22) Filed: Oct. 19, 2023

(65) Prior Publication Data

US 2024/0129354 A1     Apr. 18, 2024

Related U.S. Application Data

(63) Continuation of application No. 17/569,206, filed on Jan. 5, 2022, now Pat. No. 11,805,161, which is a
(Continued)

(51) Int. Cl.
*H04L 65/70* (2022.01)
*G10L 19/00* (2013.01)
(Continued)

(52) U.S. Cl.
CPC .............. *H04L 65/70* (2022.05); *G10L 19/00* (2013.01); *H04L 27/34* (2013.01); *H04L 65/65* (2022.05)

(58) Field of Classification Search
CPC ......... H04L 65/70; H04L 27/34; H04L 65/65; H04L 65/762; G10L 19/00
See application file for complete search history.

(56) References Cited

U.S. PATENT DOCUMENTS 11,095,999 B1    8/2021  Farrar et al.
11,146,836 B1   10/2021  Farrar et al.
(Continued)

FOREIGN PATENT DOCUMENTS

WO    2021101570    5/2021
WO  WO 2021101571   5/2021
(Continued)

OTHER PUBLICATIONS

International Search Report and Written Opinion for International Application No. PCT/US2021/045714, mailed Nov. 16, 2021.
(Continued)

*Primary Examiner* — Daniel Pihulic
(74) *Attorney, Agent, or Firm* — NORTON ROSE FULBRIGHT US LLP

(57) ABSTRACT

Methods and systems for improved data transmission using audio transmissions are provided. In one embodiment, a method is provided that includes receiving an audio transmission at. Audio symbols may be identified within the audio transmission, and a magnitude and phase for each of the symbols may be identified. Based on the magnitudes and phases, corresponding data values may be identified for each of the audio symbols and may be combined to form a data payload of the audio transmission.

20 Claims, 16 Drawing Sheets

Related U.S. Application Data continuation-in-part of application No. 17/400,783, filed on Aug. 12, 2021, now Pat. No. 11,539,449, and a continuation-in-part of application No. PCT/US2019/062820, filed on Nov. 22, 2019, and a continuation-in-part of application No. PCT/US2019/062823, filed on Nov. 22, 2019.

(60) Provisional application No. 63/065,221, filed on Aug. 13, 2020.

(51) Int. Cl.
H04L 27/34 (2006.01)
H04L 65/65 (2022.01)

(56) References Cited

U.S. PATENT DOCUMENTS

| | | | |
|---|---|---|---|
| 11,539,449 B2 * | 12/2022 | Farrar | G10L 19/02 |
| 11,805,161 B2 * | 10/2023 | Farrar | H04L 65/762 |
| 2003/0035357 A1 | 2/2003 | Ishii et al. | |
| 2006/0268831 A1 | 11/2006 | Ulybin | |
| 2008/0166126 A1 | 7/2008 | Ohm et al. | |
| 2009/0198499 A1 | 8/2009 | Lee et al. | |
| 2010/0021003 A1 | 1/2010 | Baum et al. | |
| 2016/0309278 A1 | 10/2016 | Hiscock | |
| 2018/0331724 A1 | 11/2018 | Li et al. | |
| 2019/0190621 A1 | 6/2019 | Prince et al. | |
| 2021/0218527 A1 | 7/2021 | Li et al. | |
| 2021/0226710 A1 | 7/2021 | Farrar et al. | |
| 2021/0360361 A1 | 11/2021 | Farrar et al. | |
| 2022/0030289 A1 | 1/2022 | Farrar et al. | |
| 2022/0052768 A1 * | 2/2022 | Farrar | G10L 19/02 |
| 2022/0070601 A1 | 3/2022 | Farrar et al. | |
| 2022/0159053 A1 * | 5/2022 | Farrar | H04L 65/70 |
| 2022/0407547 A1 | 12/2022 | Mendel | |
| 2023/0123098 A1 * | 4/2023 | Farrar | H04B 11/00 367/137 |
| 2024/0072910 A1 * | 2/2024 | Mendel | H04B 11/00 |
| 2024/0129354 A1 * | 4/2024 | Farrar | H04L 65/762 |

FOREIGN PATENT DOCUMENTS

| | | | |
|---|---|---|---|
| WO | WO 2021146586 | 7/2021 | |
| WO | WO 2021188633 | 9/2021 | |
| WO | WO 2021236731 | 11/2021 | |
| WO | WO 2022036076 | 2/2022 | |
| WO | WO-2022036076 A1 * | 2/2022 | G10L 19/00 |
| WO | WO-2023133433 A1 * | 7/2023 | |

OTHER PUBLICATIONS

International Search Report and Written Opinion issued in International Application No. PCT/US23/60128 mailed Jun. 7, 2023.

* cited by examiner

TRANSMITTING DATA USING AUDIO TRANSMISSIONS AND QUADRATURE AMPLITUDE MODULATION AND ASSOCIATED EQUALIZATION STRATEGIES

CROSS-REFERENCE TO RELATED APPLICATIONS

The present application is a continuation of U.S. patent application Ser. No. 17/569,206 filed Jan. 5, 2022, which is a continuation-in-part of U.S. patent application Ser. No. 17/400,783 filed Aug. 12, 2021 (now U.S. Pat. No. 11,539,449, which claims priority to U.S. Prov. App. 63/065,221 filed Aug. 13, 2020. US '783 is also a continuation-in-part of PCT Apps. PCT/US2019/62820 and PCT/US2019/62823 filed Nov. 22, 2019. The listed applications are hereby incorporated by reference in their entirety for all purposes.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative methods and systems for improved data transmission using audio transmissions. In a first aspect, a method is provided that includes receiving, at a first computing device, an audio transmission from a second computing device and identifying a plurality of audio symbols within the audio transmission. The method may also include identifying, for each audio symbol of at least a subset of the plurality of audio symbols, a magnitude of the audio symbol and a phase of the audio symbol and identifying, for each audio symbol of at least the subset of the plurality of audio symbols, a corresponding data value for the audio symbol based on the magnitude of the audio symbol and the phase of the audio symbol. The method may further include combining corresponding data values for at least the subset of the plurality of audio symbols to form a data payload of the audio transmission.

In a second aspect according to the first aspect, identifying corresponding data values for at least the subset of the plurality of audio symbols includes identifying predetermined data values based on predetermined combinations of magnitudes and phases.

In a third aspect according to the second aspect, the predetermined data values are identified according to a Quadrature Amplitude Modulation (QAM) protocol for encoding and/or decoding data values.

In a fourth aspect according to the third aspect, the QAM protocol includes at least one of a 4-bit QAM protocol, a 5-bit QAM protocol, a 6-bit QAM protocol, a 7-bit QAM protocol, an 8-bit QAM protocol, a 9-bit QAM protocol, and a 10-bit QAM protocol.

In a fifth aspect according to any of the first through fourth aspects, the method further includes, before identifying, for each audio symbol of at least a subset of the plurality of audio symbols, a magnitude of the audio symbol and a phase of the audio symbol, adjusting magnitudes of at least the subset of the plurality of audio symbols based on a predetermined portion of the audio transmission.

In a sixth aspect according to the fifth aspect, adjusting the magnitudes of at least the subset of the plurality of audio symbols comprises detecting the predetermined portion of the audio transmission and determining a power distribution for at least one predetermined frequency during the predetermined portion of the audio transmission. Adjusting the magnitudes may further include identifying a magnitude for the at least one predetermined frequency within the power distribution and adjusting the magnitudes of the at least the subset of the plurality of audio symbols based on the magnitude of the at least one predetermined frequency.

In a seventh aspect according to any of the first through sixth aspects, the method further includes, before identifying, for each audio symbol of at least a subset of the plurality of audio symbols, a magnitude of the audio symbol and a phase of the audio symbol, adjusting timing information of at least the subset of the plurality of audio symbols based on a predetermined portion of the audio transmission.

In an eighth aspect according to any of the first through seventh aspects, the method further includes, before identifying, for each audio symbol of at least a subset of the plurality of audio symbols, a magnitude of the audio symbol and a phase of the audio symbol, adjusting phases of at least the subset of the plurality of audio symbols based on a predetermined portion of the audio transmission.

In a ninth aspect according to the eighth aspect, adjusting the phases of at least the subset of the plurality of audio symbols includes detecting the predetermined portion of the audio transmission and comparing received phases of the predetermined portion at one or more times to expected phases of the predetermined portion at the one or more times. Adjusting the phases may also include determining, based on one or more differences between the phases and the expected phases, a movement speed between a transmitter of the audio transmission and a receiver of the audio transmission and adjusting the phases of at least the subset of the plurality of audio symbols based on the movement speed.

In a tenth aspect according to any of the first through ninth aspects, identifying audio symbols includes identifying a predetermined portion of the audio transmission in a received audio signal and identifying the plurality of audio symbols within the received audio signal based on a detection time of the predetermined portion.

In an eleventh aspect according to any of the first through tenth aspects, determining the magnitude of the audio symbol includes determining a magnitude of a carrier frequency of the audio transmission during the audio symbol. Determining the phase of the audio symbol may also include determining a phase of a carrier frequency of the audio transmission.

In a twelfth aspect according to any of the first through eleventh aspects, combining the corresponding data values includes sequentially combining the corresponding data values according to an order in which the audio symbols occur within the audio transmission.

In a thirteenth aspect, a system is provided that includes a processor and a memory. The memory may store instructions which, when executed by the processor, cause the processor to receive, at a first computing device, an audio transmission from a second computing device, identify a plurality of audio symbols within the audio transmission, and identify, for each audio symbol of at least a subset of the plurality of audio symbols, a magnitude of the audio symbol and a phase of the audio symbol. The instructions may also cause the processor to identify, for each audio symbol of at least the subset of the plurality of audio symbols, a corresponding data value for the audio symbol based on the magnitude of the audio symbol and the phase of the audio symbol and combine corresponding data values for at least the subset of the plurality of audio symbols to form a data payload of the audio transmission.

In a fourteenth aspect according to the thirteenth aspect, the instructions further cause the processor, while identifying corresponding data values for at least the subset of the plurality of audio symbols, cause the processor to identify predetermined data values based on predetermined combinations of magnitudes and phases.

In a fifteenth aspect according to the fourteenth aspect, the predetermined data values are identified according to a Quadrature Amplitude Modulation (QAM) protocol for encoding and/or decoding data values.

In a sixteenth aspect according to the fifteenth aspect, the QAM protocol includes at least one of a 4-bit QAM protocol, a 5-bit QAM protocol, a 6-bit QAM protocol, a 7-bit QAM protocol, an 8-bit QAM protocol, a 9-bit QAM protocol, and a 10-bit QAM protocol.

In a seventeenth aspect according to any of the thirteenth through sixteenth aspects, the instructions further cause the processor, before identifying, for each audio symbol of at least a subset of the plurality of audio symbols, a magnitude of the audio symbol and a phase of the audio symbol, to adjust magnitudes of at least the subset of the plurality of audio symbols based on a predetermined portion of the audio transmission.

In an eighteenth aspect according to the seventeenth aspect, the instructions further cause the processor, while adjusting the magnitudes of at least the subset of the plurality of audio symbols, to detect the predetermined portion of the audio transmission and determine a power distribution for at least one predetermined frequency during the predetermined portion of the audio transmission. The instructions may also cause the processor to identify a magnitude for the at least one predetermined frequency within the power distribution and adjust the magnitudes of the at least the subset of the plurality of audio symbols based on the magnitude of the at least one predetermined frequency.

In a nineteenth aspect according to any of the thirteenth through eighteenth aspects, the instructions further cause the processor, before identifying, for each audio symbol of at least a subset of the plurality of audio symbols, a magnitude of the audio symbol and a phase of the audio symbol, to adjust timing information of at least the subset of the plurality of audio symbols based on a predetermined portion of the audio transmission.

In a twentieth aspect according to any of the thirteenth through nineteenth aspects, the instructions further cause the processor, before identifying, for each audio symbol of at least a subset of the plurality of audio symbols, a magnitude of the audio symbol and a phase of the audio symbol, to adjust phases of at least the subset of the plurality of audio symbols based on a predetermined portion of the audio transmission.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to phase shift correction of audio transmissions that are used to transmit data between computing devices.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi® links between computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
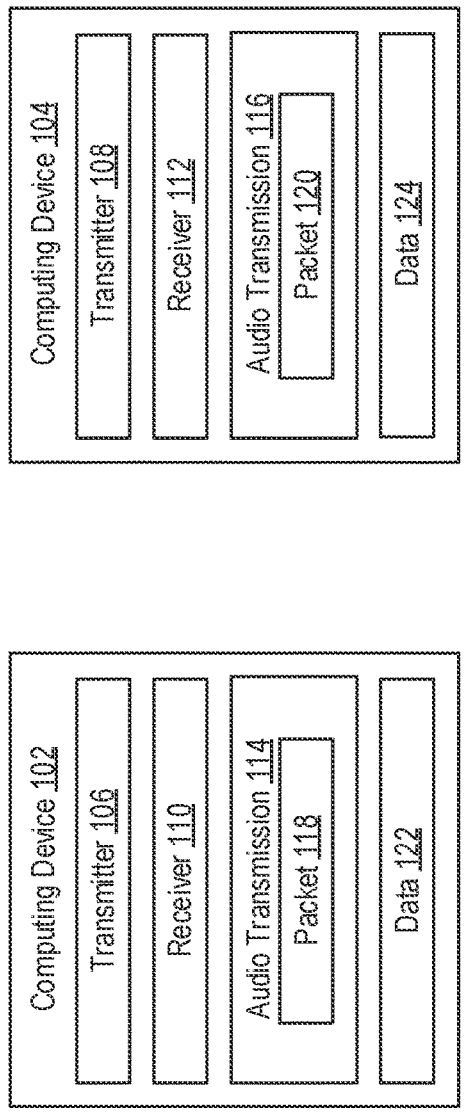
FIG. 1 illustrates a system according to an exemplary embodiment of the present disclosure.

Therefore, there exists a need to wireless transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a speaker external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smart phone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing both a speaker and a microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112). In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

Figure 2:
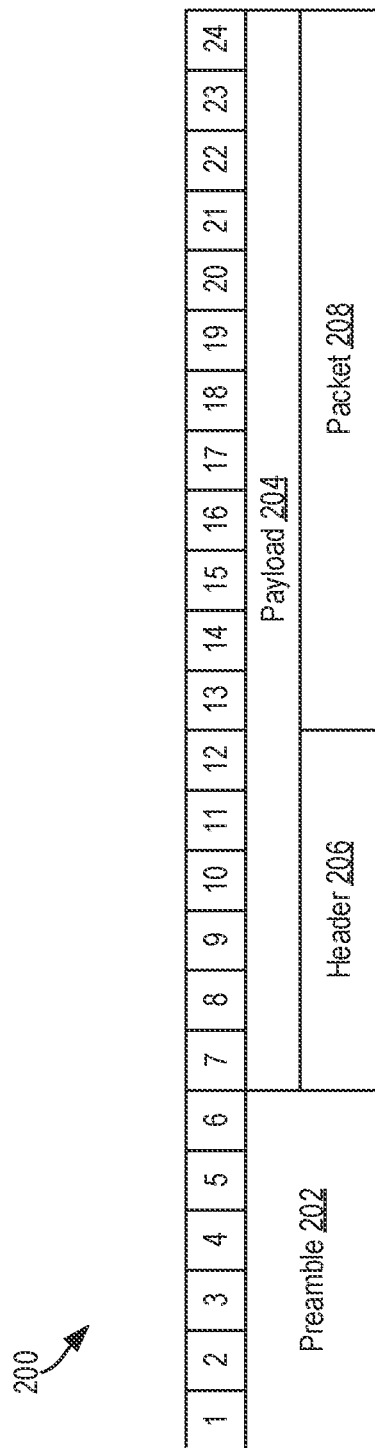
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated onto an audio channel (e.g., one or more predetermined carrier signals including a predetermined baseband signal such as a pulse-shaped complex number and/or a predetermined carrier frequency) in order to encode information in the audio transmission 200. In particular, information may be encoded by modulating or varying the phase of the audio channel for each symbol 1-24.

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined symbols produced at predetermined points of time (e.g., according to a predetermined phase difference pattern and/or frequency pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

In practice, certain encoding strategies may be used to encode digital data within individual symbols of an audio transmission. For examples, various types of phase shift keying techniques may be used to encode data within the payload of an audio transmission. However, in practice, such techniques may only be able to encode limited amounts of data while still allowing the data accurately reconstructed by a receiving computing device (e.g., due to interference when transmitting/receiving the audio transmission). Accordingly, these techniques may limit the total data bandwidth for communication by audio transmission between two computing devices. This may thus reduce the total data that can be transmitted in a single audio transmission, which may require computing devices to transmit multiple audio transmissions to send a single message or digital data payload. Relying on more audio transmissions increases the chances that interference will prevent at least one of the audio transmissions from being successfully received and processed. Furthermore, in implementations where a single computing device communicates with multiple computing devices, or multiple computing devices communicate with one another, using audio transmissions, reduced data throughput and the need to transmit additional audio transmissions may reduce the total number of computing devices that can communicate at the same time. Therefore, there exists a need to encode data into audio transmissions with greater efficiency.

One solution to this problem is to encode data in audio transmissions using quadrature amplitude modulation (QAM) protocols. Such protocols encode data using both the phase and magnitude of an audio signal, instead of just one or the other. This increases the total number of bits that can be encoded in a single audio transmission symbol, and thus the total amount of data that can be encoded in an audio transmission of a given length. The data can be encoded by finding a corresponding amplitude and magnitude for individual data values and modulating the corresponding amplitude and magnitude onto a carrier audio signal for transmission. When a computing device receives an audio transmission, the data can be extracted by identifying individual audio symbols within a received audio signal and identifying a magnitude and phase for each of the audio symbols. Corresponding data values may then be identified based on the magnitude and phase for each symbol and reconstructed to form the data payload of the audio transmission.

Figure 3:
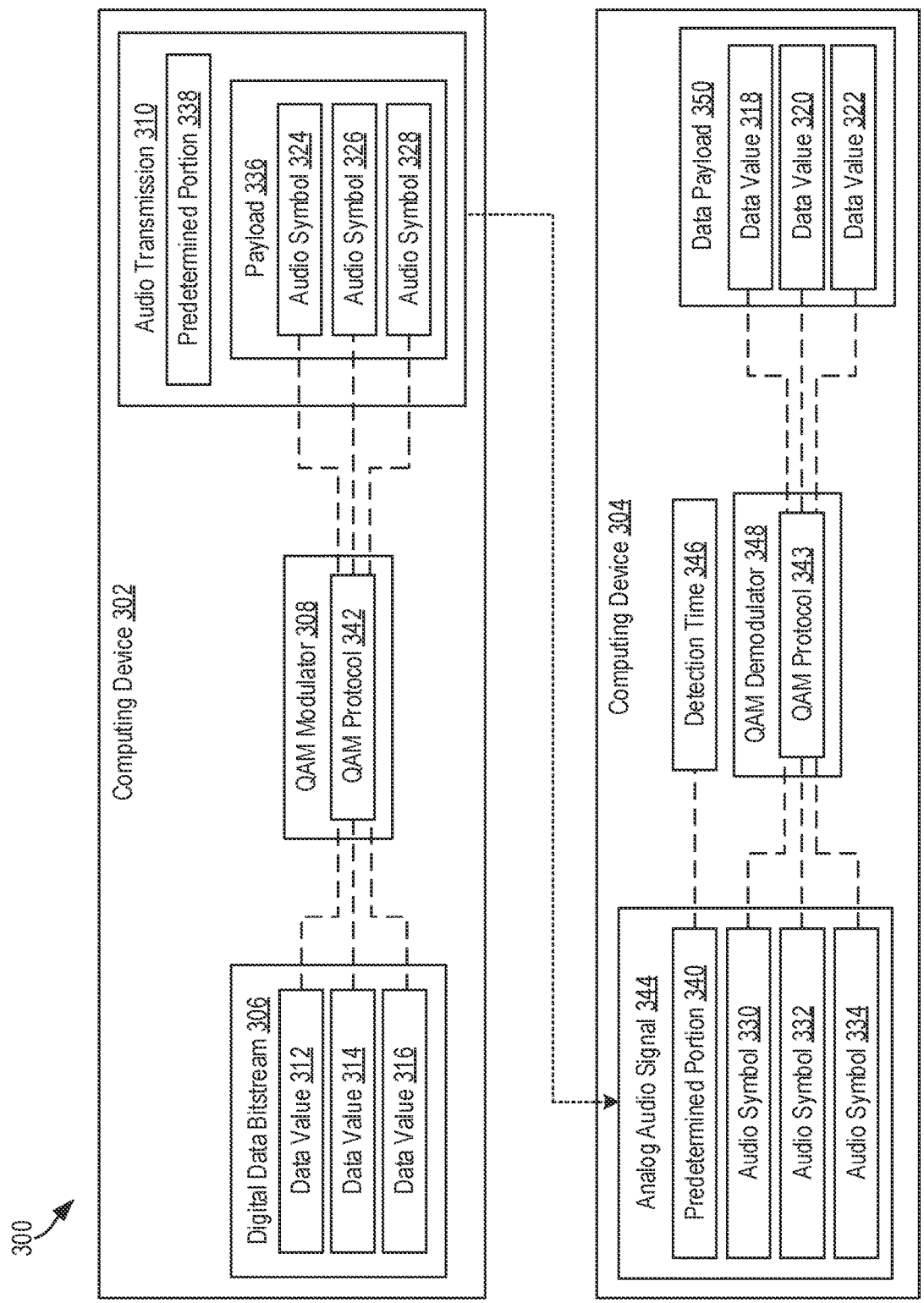
FIG. 3 illustrates a system according to an exemplary embodiment of the present disclosure.

FIG. 3 illustrates a system 300 according to an exemplary embodiment of the present disclosure. The system 300 may be configured to transmit data using audio transmissions where the data is encoded and decoded according to a quadrature amplitude modulation (QAM) protocol. The system 300 includes a computing device 302, which may generate and transmit an audio transmission 310, and the computing device 304, which may receive an analog audio signal 344 and extract a data payload 350 from the analog audio signal 344.

The computing device contains a digital data bitstream 306. The digital data bitstream 306 may contain digital data that is to be transmitted using one or more audio transmissions 310. In particular, the digital data bitstream 306 may contain a series of bit values representing the digital data. These bit values may be divided into one or more data values 312, 314, 316. Each of the data values 312, 314, 316 may be generated to ultimately represent one or more audio symbols of an audio transmission (e.g., similar to the symbols 1-24 of the audio transmission 200).

The computing device 302 may generate an audio transmission 310 to transmit all or part of the data contained within the digital data bitstream 306. In particular, the audio transmission 310 may include a payload 336 that contains a one or more audio symbols 324, 326, 328 corresponding to individual data values 312, 314, 316 of the digital data bitstream 306. For example, the audio symbol 324 may correspond to the data values 312, the audio symbol 326 may correspond to the data values 314, and/or the audio symbol 328 may correspond to the data values 316. The audio symbols 324, 326, 328 may be generated by encoding the corresponding data values 312, 314, 316 onto an audio carrier signal according to a quadrature amplitude modulation (QAM) protocol 342. In particular, the audio symbols 324, 326, 328 may encode the data values 312, 314, 316 as combinations of phases and magnitudes of the audio carrier signal (e.g., one or more predetermined audio carrier frequencies). In particular, a QAM modulator 308 may determine corresponding phases and magnitudes for each of the data values 312, 314, 316 according to the QAM article 342. The QAM modulator 308 may then modulate the corresponding phases and magnitudes onto the desired audio carrier frequency to generate the audio symbols 324, 326, 328.

The audio symbols 324, 326, 328 may be combined to form the payload 336 of the audio transmission 310 that contain data for delivery to another computing device. For example, the audio symbols 324, 326, 328 may be sequentially combined within the payload 336 according to the order of corresponding data values 312, 314, 316 within the digital data bitstream 306. For example, the audio symbol 324 may occur before the audio symbol 326 within the payload 336, and the audio symbol 326 may occur before the audio symbol 328 within the payload 336 (e.g., within the portion of an audio signal corresponding to the audio transmission 310 and the payload 336). The audio transmission 310 also contains a predetermined portion 338. The predetermined portion 338 may be used to indicate the presence of an audio transmission within an analog audio signal. For example, the predetermined portion 338 may be an exemplary implementation of the preamble 202. Additionally or alternatively, the predetermined portion 338 may be used to perform one or more equalization operations to correct for audio signal interference, as explained further below.

The computing device 302 may transmit the audio transmission 310. For example, the computing device 302 transmit the audio transmission 310 by generating an analog audio signal 344 for an audio environment surrounding the computing device 302. For example, the computing device 302 may contain or be communicatively coupled to one or more speakers or other audio transmitters. The computing device 302 may cause the speakers or audio transmitters to generate an analog audio signal (e.g., by playing or reproducing the audio signal for the audio transmission 310), such that the analog audio signal detectable within an audio environment (e.g., a physical environment) surrounding the computing device 302.

The computing device 304 may receive an analog audio signal 344. For example, the computing device 304 may include a microphone or other audio receiver configured to regularly receive and record audio information from an audio environment surrounding the computing device 304. For example, the computing device 304 may be configured to continuously receive audio signals from the surrounding audio environment. Additionally or alternatively, the computing device 304 may be configured to receive analog audio signals at regular intervals or at a particular period in time (e.g., upon arriving at a predetermined location, upon receiving a request from a software application executing on the computing device 304 and/or another computing device). In certain instances, the computing device 304 may continue to receive audio signals from the audio environment for a predetermined time and/or until a predetermined portion 340 is detected within the analog audio signal 344. For example, the computing device 304 may detect a predetermined portion 340 (which may be equivalent to the predetermined portion 338) within the analog audio signal 344. The computing device 304 may determine a detection time 346 for the predetermined portion 340. For example, the detection time 346 may indicate a time stamp, audio sample (or range of audio samples), or other indication of the time of detection for the predetermined portion 340 within the analog audio signal 344. This detection time 346 may be used to divide portions of the analog audio signal 344 into audio symbols 330, 332, 334 for further processing. For example, where the predetermined portion 338, 340 occurs at the beginning of an audio transmission according to a predetermined audio transmission protocol, the audio symbols 330, 332, 334 may be identified as audio samples for predetermined time periods after the detection time 346. For example, similar to the audio transmission 200, the audio transmission 310 may be generated to contain a preamble 202 followed by a header 206 and a packet 208. The packets 208 may contain audio symbols 324, 326, 328 corresponding to the data values 312, 314, 316. Accordingly, the computing device 304 may identify the audio symbols 330, 332, 334 as occurring for predetermined time ranges after the detection time 346. In additional or alternative implementations, audio symbols corresponding to the payload when audio transmission may occur before a predetermined portion and/or both before and after a predetermined portion. In such instances, the audio symbols 330, 332, 334 identified by the computing device 304 may occur before, after, or both before and after the detection time 346 of the predetermined portion 340.

Once the portions of the analog audio signal 344 corresponding to the audio symbols 330, 332, 334 are identified, the computing device 304 may demodulate the audio symbols 330, 332, 334 using a QAM demodulator 348 to extract data values 318, 320, 322 (which may be equivalent to the data values 312, 314, 316). In particular, the QAM demodulator 348 may demodulate the portions of the analog audio signal 344 containing the audio symbols 330, 332, 334 according to a QAM protocol 343 (which may be identical to the QAM protocol 342). For example, and as explained further below, the QAM demodulator 348 may determine a magnitude and phase an audio carrier frequency during the audio symbols 330, 332, 334 and may identify corresponding data values 318, 320, 322 based on the phase and magnitude. For example, the data value 318 may be determined based on the audio symbol 330, the data value 320 may be determined based on the audio symbol 332, and the data value 322 may be determined based on the audio symbol 334. The computing device 304 may then reconstruct a data payload 350 based on the data values 318, 320, 322. For example, the data values 318, 320, 322 may be reconstructed sequentially according to their order within the analog audio signal 344. For example, the data value 318 corresponding to the audio symbol 330 may occur before the data value 320 corresponding to the audio symbol 332, and the data value 320 may occur before the data value 322 corresponding to the audio symbol 334. By reconstructing the data payload 350, the computing device 304 is able to receive the contents of the digital data bitstream 306 via audio transmissions, without needing to communicatively pair with the computing device 302 according to one or more RF-based communication protocols. Furthermore, by using QAM instead of other encoding protocols, the amount of data contained within a given audio transmission may be increase. For example, at the same transmitting power, a 4-bit QAM protocol may be used instead of a 3-bit PSK protocol, increasing data throughput by up to 33%.

In practice, the payload 336 the audio transmission 310 may contain additional information beyond audio symbols 324, 326, 328 corresponding to data values 312, 314, 316 of the digital data bitstream. For example, the payload 336 may contain header information, similar to the header 206 of the audio transmission 200. For example, the header information may include routing information, destination information, source information, related software applications or users, or other information regarding the audio transmission 310 and/or the data that is being transmitted. In such instances, the header information may be contained within the digital data bitstream 306 and/or another data bitstream and may be divided into data values and modulated into audio symbols using techniques similar to those discussed above in connection with the digital data bitstream 306 and the payload 336. Upon demodulating and extracting the header information, the computing device 304 may proceed with routing or processing the remaining data values 318, 320, 322 according to instructions, destinations, or processes identified within the header information.

In certain implementations, the computing device 302 may transmit more than one audio transmission 310. For example, although QAM protocols enable higher data throughput than other modulation protocols, the digital data bitstream 306 may contain more information than may be reliably included within a single audio transmission 310. Accordingly, when a size or duration of the payload 336 or data values used to generate the payload 336 exceeds a predetermined threshold, the computing device 302 may transmit the audio transmission 310 and may begin generating additional audio transmissions according to similar techniques. Additionally or alternatively, the computing device 304 may be configured to generate and transmit audio transmissions using techniques similar to those performed by the computing device 302 to generate and transmit the audio transmission 310. For example, in response to the data payload 350, the computing device 304 may generate and transmit an audio transmission containing responsive data values (e.g., a user identifier for a user associated with the computing device 304).

Although not depicted, one or both of the computing devices 302, 304 may contain a processor and a memory, which may implement one or more operational aspects of the computing devices 302, 304. For example, the memory may store instructions which, when executed by the processor, may cause the processor to perform one or more operational features of the computing devices 302, 304. The processor may be implemented as one or more central processing units (CPUs), field programmable gate arrays (FPGAs), and/or graphics processing units (GPUs) configured to execute instructions stored on the memory. In certain implementations, the computing devices 302, 304 may include one or more laptops, tablet computers, smart phones, wearable computing devices, point-of-sale devices, stationary computing devices, and the like that are configured to transmit and receive audio transmissions (e.g., containing audio transmitters and receivers).

Figure 4:
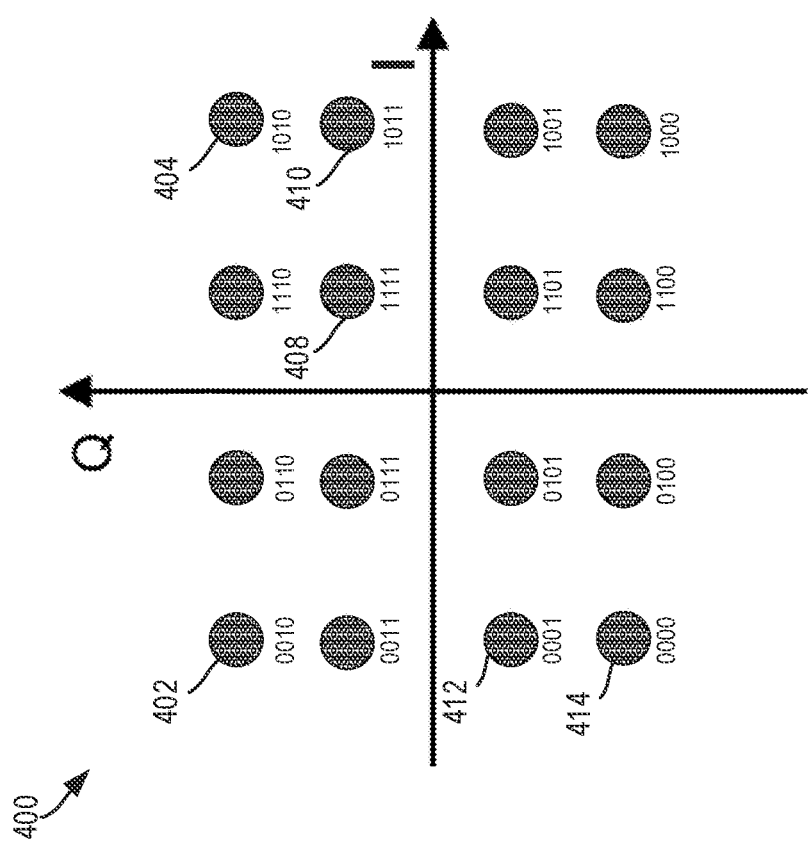
FIG. 4 illustrates a QAM protocol according to an exemplary embodiment of the present disclosure.

FIG. 4 depicts a QAM protocol 400 according to an exemplary embodiment of the present disclosure. The QAM protocol 400 may encode symbols as particular combinations of phases and magnitudes for symbols of a corresponding analog audio signal. In particular, FIG. 4 depicts the QAM protocol 400 in a constellation diagram that depicts symbols 402, 404, 408, 410, 412, 414 (only a subset of which are numbered) as combinations of an in-phase carrier (I) and a quadrature carrier (Q), where the quadrature carrier is shifted by 90 degrees in phase from the in-phase carrier (I). In the constellation diagram, different phases for symbols may be depicted as different angles around the origin of the constellation diagram (e.g., different angles from the positive in-phase carrier (I) axis) and different magnitudes may be depicted as different lengths from the origin of the constellation diagram to the symbols 402, 404, 408, 410, 412, 414. For example, symbols 404 and 408 may have the same phase but different magnitudes and symbols 402 and 404 may have the same magnitude but different phases. A symbol in a corresponding analog audio signal may be encoded according to a corresponding phase and magnitude. As a specific example, a symbol containing "1010" may be encoded as the phase and magnitude indicated by symbol 404 (e.g., equal parts of the I and Q carriers with a larger magnitude). As another example, a symbol containing "1111" may be encoded as the phase and magnitude indicated by symbol 408 (e.g., equal parts of the I and Q carriers with a smaller magnitude). The remaining symbols 402, 410, 412, 414 may be used to encode the data values indicated in FIG. 4.

As depicted, the QAM protocol 400 encodes four-bit symbols and therefore can encode up to 16 different types of symbols. Accordingly, the QAM protocol 400 may also be referred to as a 16QAM protocol. However, in additional or alternative implementations, QAM protocols may be used that encode longer or shorter symbols. For example, an 8QAM protocol may be used that supports three-bit symbols and can therefore encode up to eight different types of symbols. As another example, a 32QAM protocol may be used that supports five-bit symbols and can therefore encode up to 32 different types of symbols. As a further example, a 64 QAM protocol may be used that support six-bit symbols and can therefore encode up to 64 different types of symbols.

It should also be understood that the QAM protocol 400 is merely exemplary and that other implementations, and other 16QAM protocols, may be used. For example, in alternative implementations, a 16QAM protocol may be used that includes different combinations of phases and magnitudes than the QAM protocol 400. As another example, QAM protocols 400 (and any other QAM protocols discussed herein) may include one or more of a 4-bit QAM protocol, a 5-bit QAM protocol, a 6-bit QAM protocol, a 7-bit QAM protocol, an 8-bit QAM protocol, a 9-bit QAM protocol, and a 10-bit QAM protocol. All such protocols are considered within the scope of the present disclosure.

Figure 5:
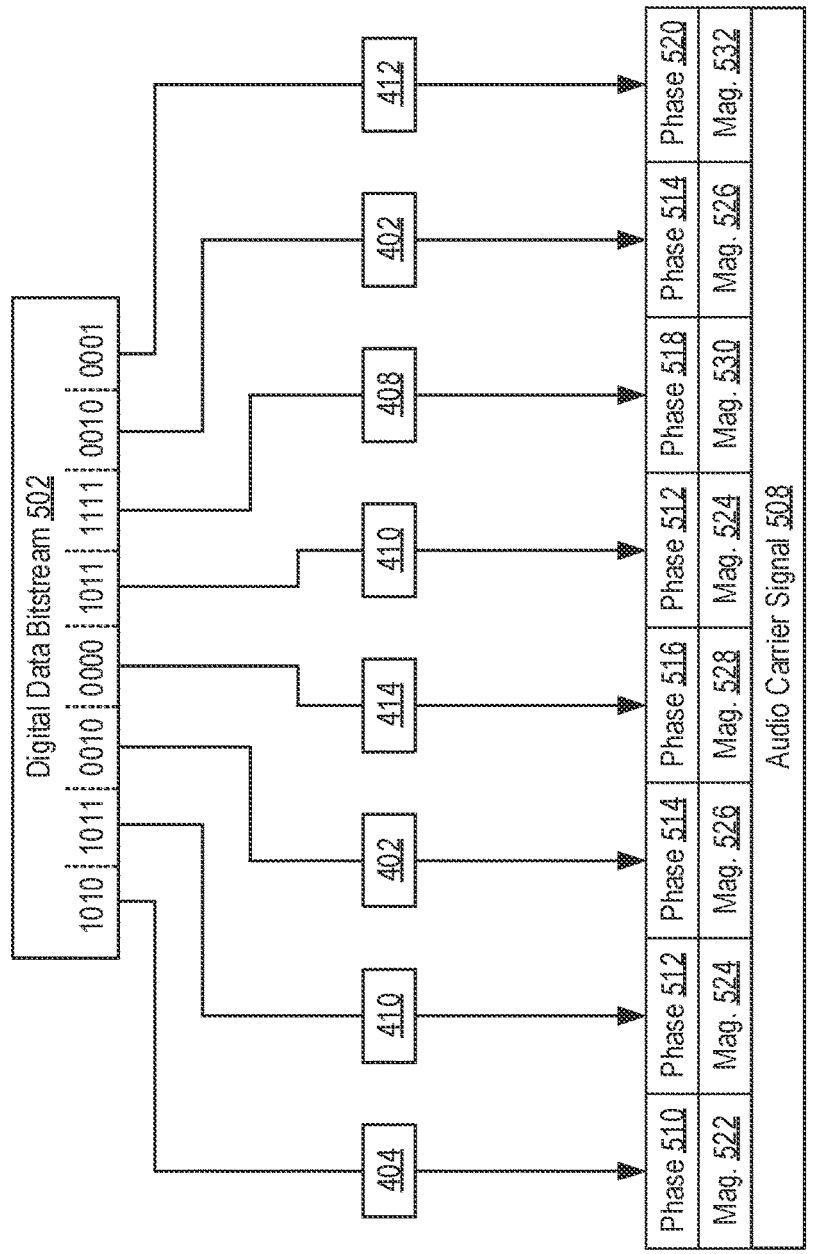
FIG. 5 illustrates an encoding procedure according to an exemplary embodiment of the present disclosure.

FIG. 5 illustrates an encoding procedure 500 according to an exemplary embodiment of the present disclosure. The encoding procedure 500 may be performed to encode a digital data bitstream 502 according to the QAM protocol 400 to generate an analog audio signal 506 for transmission using an audio transmitter. For example, the encoding procedure 500 may be performed by a QAM modulator, such as the QAM modulator 308 of the computing device 302.

The digital data bitstream 502 contains 32 bits of data. The bits of data have been divided into eight 4-bit data values: "1010," "1011," "0010," "0000," "1011," "1111," "0010," and "0001." To generate an analog audio signal 506 containing modulated versions of the data values in the digital data bitstream 502, corresponding symbols may be identified (e.g., by the QAM modulator 308) according to the QAM protocol 400 for each data value. The symbol 404 may be identified as corresponding to the first data value "1010," the symbol 410 may be identified as corresponding to the second data value "1011," the symbol 402 may be identified as corresponding to the third data value "0010," the symbol 414 may be identified as corresponding to the fourth data value "0000," the symbol 410 may be identified as corresponding to the fifth data value "1011," the symbol 408 may be identified as corresponding to the sixth data value "1111," the symbol 402 may be identified as corresponding to the seventh data value "0010," and the symbol 412 may be identified as corresponding to the eighth data value "0001." Corresponding symbols may be identified in the QAM protocol 400 by identifying a symbol, phase, and magnitude that correspond to the same data value within QAM protocol 400.

The data values may then be modulated onto an audio carrier signal 508 to generate an analog audio signal 506 containing the data values within the digital data bitstream 502. In particular, each of the corresponding symbols 402, 404, 408, 410, 412, 414 may be modulated onto an audio carrier signal (e.g., an ultrasonic audio carrier frequency of 18 kHz or higher) for sequential time periods of the analog audio signal 506. In particular, each corresponding symbol 402, 404, 408, 410, 412, 414 may be represented as sequential, 2 ms durations of audio samples within the analog audio signal 506 (or other durations). In particular, the first corresponding symbol 404 may be modulated onto the audio carrier signal 508 as corresponding phase 510 and magnitude 522. The second corresponding symbol 410 may be modulated onto the audio carrier signal 508 as corresponding phase 512 and magnitude 524. The third corresponding symbol 402 may be modulated onto the audio carrier signal 508 as corresponding phase 514 and magnitude 526. The fourth corresponding symbol 414 may be modulated onto the audio carrier signal 508 as corresponding phase 516 and magnitude 528. The fifth corresponding symbol 410 may be modulated onto the audio carrier signal 508 as corresponding phase 512 and magnitude 524. The sixth corresponding symbol 408 may be modulated onto the audio carrier signal 508 as corresponding phase 518 and magnitude 530. The seventh corresponding symbol 402 may be modulated onto the audio carrier signal 508 as corresponding phase 514 and magnitude 526. The eighth corresponding symbol 412 may be modulated onto the audio carrier signal 508 as corresponding phase 520 and magnitude 532. As depicted in FIG. 5, the corresponding phases and magnitudes may be modulated onto the audio carrier frequency 508 in the order in which the corresponding data values occur within the digital data bitstream 502 (e.g., in the order in which the phases the magnitudes were described above). The analog audio signal 506 may then be added to the audio signal for a predetermined portion of an audio transmission (e.g., the predetermined portion 338 and may then be transmitted into an audio environment using an audio transmitter the corresponding computing device.

Figure 6:
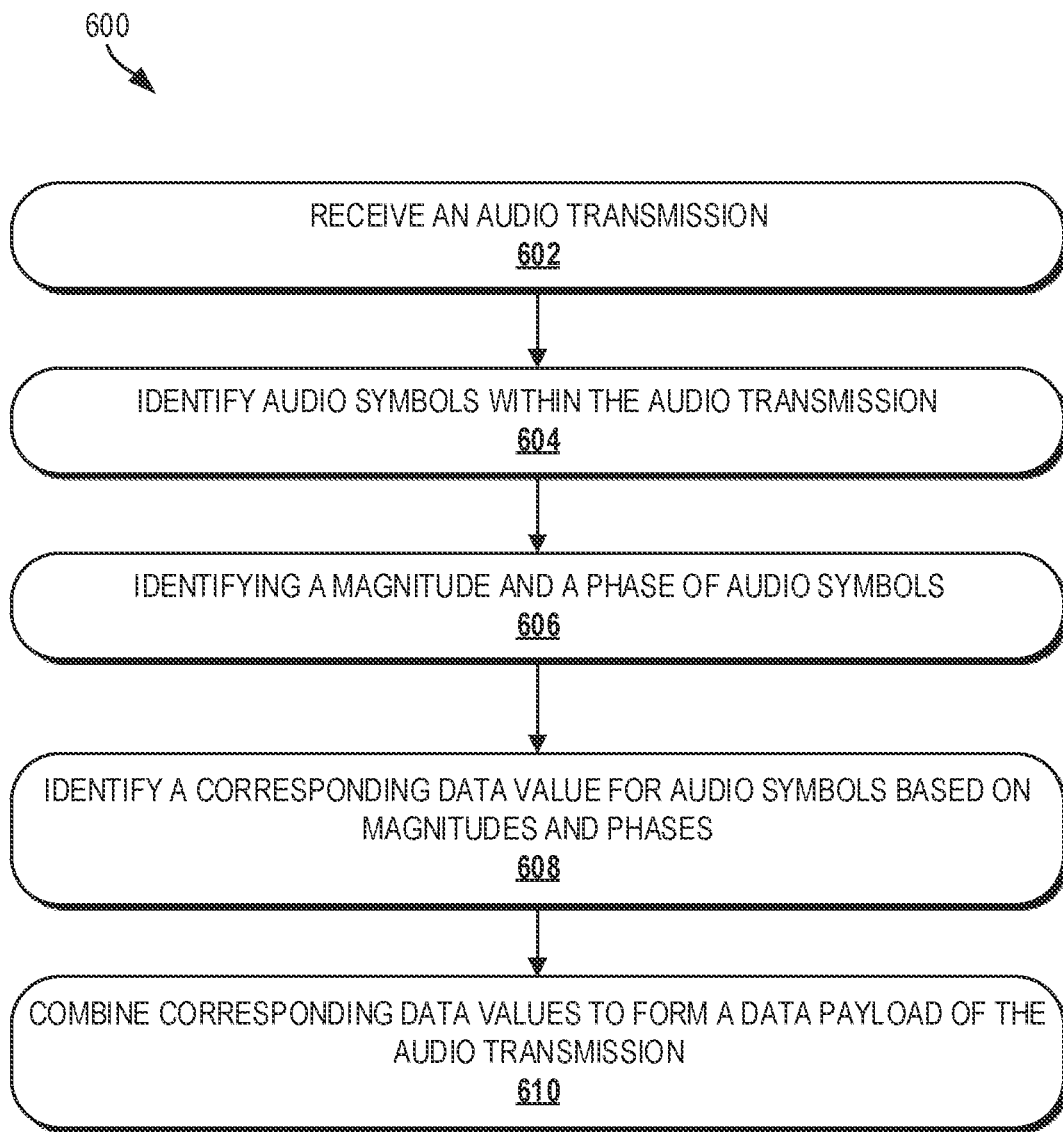
FIG. 6 illustrates a method according to an exemplary embodiment of the present disclosure.

FIG. 6 illustrates a method 600 for generating an audio transmission containing data using a QAM protocol according to an exemplary embodiments of the present disclosure. The method 600 may be implemented on a computer system, such as the system 300. For example, the method 600 may be implemented by the computing device 302 and/or the computing device 304. The method 600 may also be implemented by a set of instructions stored on a computer readable medium that, when executed by a processor, cause the computer system to perform the method 600. For example, all or part of the method 600 may be implemented by a processor and a memory of the computing devices 302, 304. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving an audio transmission (block 602). For example, the computing device 304 may receive an audio transmission from another computing device 302. In particular, computing device 304 a receiving an analog audio signal 344 from an audio receiver (e.g., the computing device 304). The analog audio signal 344 may capture audio data from an audio environment surrounding the computing device 304. The computing device 304 may be configured to detect audio transmissions within the analog audio signal 344 by detecting a predetermined portion 340 within the analog audio signal 344. For example, computing device 304 may compare incoming audio data to a template or other series of expected values for the predetermined portion 340. Upon determining that a similarity between the received audio data and the expected values for the predetermined portion 340 exceeds a predetermined value, the computing device 304 may determine that the predetermined portion 340 has been detected and may identify a corresponding detection time 346 (e.g., a beginning timestamp of the predetermined portion 340 is detected, and ending timestamp of the predetermined portion 340 is detected, and/or any other timestamp of the predetermined portion 340 when detected within the analog audio signal 344).

Audio symbols may be identified within the audio transmission (block 604). For example, the computing device 304 may identify audio symbols 330, 332, 334 within the analog audio signal 344 in which the audio transmission 310 is detected (e.g., in which the computing device 304 detects the predetermined portion 340). For example, the audio symbols 330, 332, 334 may be identified based on a detection time 346 of the predetermined portion 340. For example, and as explained above, the audio symbols 330, 332, 334 may be identified as corresponding timestamp ranges or audio sample ranges of the analog audio signal that are located at predetermined times before and/or after the detection time 346. For example, the first five audio symbols 330, 332, 334 may be identified as sequential 2 ms sequences of audio samples that occur immediately after the detection time 346 (e.g., such that the first five audio symbols 330, 332, 334 comprise the 10 ms of audio samples within the analog audio signal 344 that occur immediately after the detection time 346). In additional or alternative implementations, durations for the audio symbols 330, 332, 334 may differ. Accordingly, the ranges of timestamps and/or audio samples identified as corresponding to each of these audio symbols 330, 332, 334 may similarly differ.

A magnitude and a phase of the audio symbols may be identified (block 606). For example, the computing device 304 may identify a corresponding phase and magnitude for each of the audio symbols 330, 332, 334 identified at block 604. Corresponding magnitudes may be determined as an average audio symbol magnitude (e.g., average magnitude, RMS magnitude) for the audio samples associated with each audio symbol. Corresponding phases may be determined by comparing phases for audio samples associated with each audio symbol 330, 332, 334 with phases for a non-modulated version of the same audio carrier signal 508 and/or with phases of previous symbols. Differences between the phases of the received audio samples and the non-modulated audio carrier signal may be identified as the phases for the corresponding audio symbol 330, 332, 334. As a specific example, and turning to FIG. 5, for the first audio sample of the analog audio signal 506, the computing device 304 may identify the corresponding phase 510 and magnitude 522. This process may be repeated each of the audio symbols 330, 332, 334 within the analog audio signal 344, or a subset thereof.

A corresponding data value may be identified for the audio symbols based on the magnitudes and phases (block 608). For example, the computing device 304 may identify a corresponding data value 318, 320, 322 for the audio symbols 330, 332, 334 based on the corresponding magnitudes and phases identified at block 606. In particular, the computing device 304 may identify the corresponding data values 318, 320, 322 based on a QAM protocol 342, 343, 400. In particular, the computing device 304 may identify the corresponding data values 318, 320, 322 as the data values with the closest corresponding phases and magnitudes to the identified phases the magnitudes for the audio symbols 330, 332, 334 within the QAM protocol 342, 343, 400.

The corresponding data values may be combined to form a data payload of the audio transmission (block 610). For example, the computing device 304 may combine the data values 318, 320, 322 to form a data payload 350 of the received audio transmission (e.g., the audio transmission 310) detected within the analog audio signal 344. In particular, the data values 318, 320, 322 may be combined sequentially within the data payload 350 according to the order in which the corresponding audio symbols 330, 332, 334 are detected within the analog audio signal 344, as explained above.

Accordingly, the method 600 enables computing devices to receive and extract data from analog audio signals containing audio transmissions containing data encoded according to a QAM protocol. As explained above, using audio transmissions to transmit data may result in one or more bandwidth constraints due to the limited bandwidth available for audio transmissions. Utilizing a QAM protocol increases the overall data throughput for audio transmissions (e.g., by 33%) by encoding associated data values using both the phase and magnitude of an audio carrier signal. Being able to transmit greater amounts of data may reduce the total number of audio transmissions required to transmit a particular piece of data. Furthermore, resulting audio transmissions may be shorter, allowing for the audio transmissions themselves to be transmitted faster. This may be particularly useful in embodiments where one computing device is communicating with multiple other computing devices, by increasing the total number of computing devices that are capable of exchanging audio transmissions because fewer audio transmissions have to be transmitted to each individual computing device.

However, these benefits come with their own risks. In particular, because QAM protocols rely on both magnitude and phase information to encode data, audio transmissions that utilize QAM protocols are susceptible to both types of interference: interference that affects the magnitude of the audio signal and interference that affects the phase of the audio signal. One or both types of interference may be common in many audio environments. Accordingly, it may be necessary to detect and correct for such interferences before beginning to extract data from a received audio signal in order to ensure that the extracted data has not been altered by interference between computing devices that communicate using audio transmissions.

Beginning with interference to the magnitude of an audio signal, because audio transmissions propagate via sound waves traveling through air, different frequencies may be transmitted differently and/or may propagate differently and may be subject to different types and amounts of interference. In particular, audio transmissions may utilize more than one frequency to modulate and transmit the data. Different frequencies may experience varying rates of attenuation during transmission between the computing devices. This attenuation may be caused by environmental factors (e.g., attenuation during propagation through the environment) and/or transmission factors (e.g., attenuation caused by the transmitter while transmitting the audio transmission). Also, higher frequencies may have greater directionality than lower frequencies. The directionality may cause the magnitude of certain frequencies to change depending on the location of a computing device receiving an audio transmission relative to a computing device transmitting an audio transmission. Different frequencies can also be delayed or advanced differently during propagation, which may cause different portions of an audio transmission that utilize different frequencies to arrive out of sequence or with inconsistent time gaps.

Therefore, there exists a need to identify and correct these types of frequency-dependent magnitude interference for audio transmissions. One solution to this problem is to generate the audio transmission to include a portion with known frequencies that occur at known times. Then, a computing device that receives the audio transmission can identify the portion of the audio transmission and compute a frequency distribution of the portion of the audio transmission. Based on the frequency distribution, maximum magnitudes can be determined for each of the known frequencies of the portion of the audio transmission. The maximum magnitudes can be used to equalize the remaining portions of the audio transmission. The equalization can then adjust the magnitude of differently-attenuated frequencies to normalize the frequencies. For example, the equalization may increase the relative magnitude of highly-attenuated frequencies and may decrease the relative magnitude of less-attenuated frequencies. The computing device that receives the audio transmission can also compare the received time for each of the known frequencies to a known time for each of the known frequencies. Based on the comparison, time errors for each of the known frequencies can be determined. These delays can then be applied to the frequencies within the remaining portions of the audio transmission, restoring the proper sequencing and timing information for the audio transmission. In this way, the computing device that receives the audio transmission can properly account for both magnitude and time delays of received audio transmissions. Furthermore, because the correction is performed by the computing device receiving an audio transmission, these techniques can account for sources of interference that change according to the location of the computing device receiving the audio transmission (e.g., interference caused by the location of the computing device receiving an audio transmission and/or interference caused by the environment between the computing device receiving the audio transmission and a computing device transmitting the audio transmission) without requiring special processing by the computing device that transmits the audio transmission.

Figure 7:
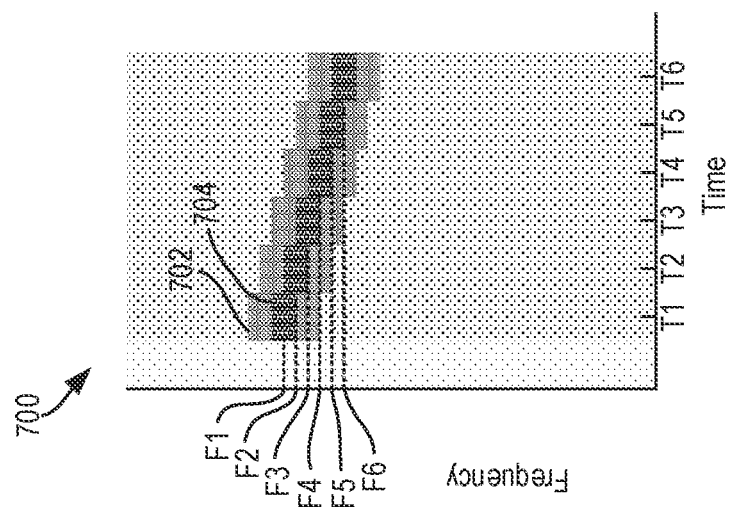
FIG. 7 illustrates a spectrogram of a preamble according to an exemplary embodiment of the present disclosure.

FIG. 7 illustrates a spectrogram 700 of a preamble according to an exemplary embodiment of the present disclosure. Referring to FIG. 2, the preamble may correspond to a preamble 202 of an audio transmission 200 transmitted by a computing device (e.g., before transmission by the computing device). The spectrogram 700 indicates the relative power distribution between frequencies at multiple times T1-T6 within a received audio transmission (e.g., within the preamble of a received audio transmission). The times T1-T6 may correspond to symbols of a received audio transmission. For example, and referring again to FIG. 2, the times T1-T6 may correspond to the symbols 1-6 of the preamble 202. When an audio transmission is initially transmitted, each time T1-T6 may have a corresponding, predetermined frequency. The spectrogram indicates these frequencies F1-F6 at times T1-T6 corresponding to the symbols 1-6. In particular, the times T1-T6 may have a corresponding frequency range 704 with high power concentration and a frequency range 702 with medium or low power concentration. The frequency F1-F6 corresponding to each time T1-T6 may be identified based on the frequency range 704 with high power concentration at each time T1-T6. For example, as illustrated, the frequencies F1-F6 corresponding to each time T1-T6 may be identified as the frequencies F1-F6 located in the middle of the frequency ranges 704 with high power concentration. Additionally or alternatively, the frequencies F1-F6 may be identified as the frequency with the highest power concentration within the frequency range 704 for each time T1-T6. Only one instance of the frequency range 704 and one instance of the frequency range 702 are numbered at time T1, but it should be understood that references to either frequency range 702, 704 herein refer to all such frequency ranges for the other times T2-T6.

As depicted, the preamble includes six predetermined frequencies F1-F6 that decrease in frequency from time T1 to time T6. However, other configurations may include additional or fewer predetermined frequencies. Further, the predetermined frequencies may follow alternative patterns. In particular, other implementations may include predetermined frequencies that increase in frequency over time, or that follow any other pattern or progression over time.

In certain implementations, rather than being implemented as separate, predetermined frequencies F1-F6, the preamble may instead be implemented as a continuous frequency sweep (e.g., a frequency sweep from a starting frequency to an ending frequency, or a frequency sweep following a predetermined pattern). In such implementations, the times T1-T6 may not correspond to individual symbols of the audio transmission 200. Additionally, because the preamble is implemented as a continuous frequency sweep, the times T1-T6 may not have individual corresponding frequencies. Rather, the frequencies F1-F6 may be determined as the strongest frequency at each time T1-T6 (e.g., for audio signals during a time period surrounding the times T1-T6). For example, the frequencies F1-F6 may be identified (e.g., after the audio transmission is received) as the frequencies F1-F6 with the largest magnitude in the frequency range 704 at each time T1-T6. Additional or alternative implementations may alter the number of times T1-T6 for which frequencies are identified (e.g., four time periods and four frequencies instead of six) and/or may alter the length of the preamble. In still further implementations, the spectrogram 700 may depict a portion of an audio transmission other than the preamble of the audio transmission. For example, the spectrogram 700 may instead correspond to a portion of the header of the audio transmission, such as the beginning six symbols of the header.

Figure 8:
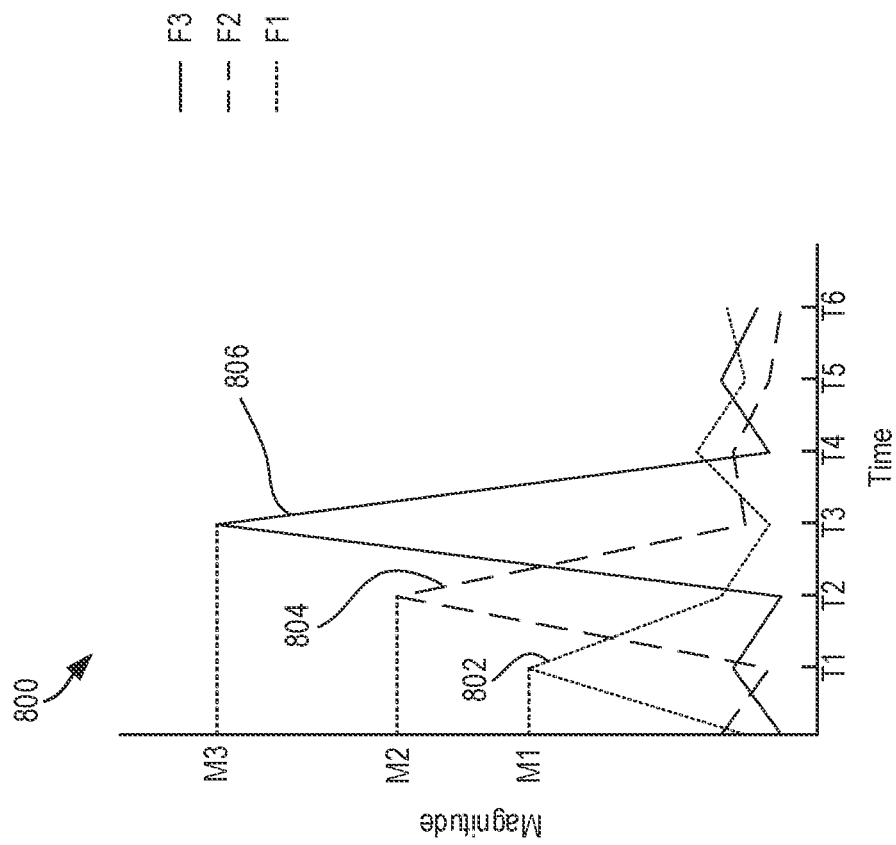
FIG. 8 illustrates a frequency magnitude plot of a portion of a received audio transmission according to an exemplary embodiment of the present disclosure.

To account for the various sources of interference affecting the audio transmissions, computing devices receiving audio transmissions may first determine the extent to which such interference has affected audio transmissions that have been received. To do so, computing devices receiving audio transmissions may, upon detecting the preamble of a received audio transmission, calculate a frequency distribution of the preamble. FIG. 8 illustrates a frequency magnitude plot 800 of a portion of a received audio transmission according to an exemplary embodiment of the present disclosure. In particular, the frequency magnitude plot 800 may depict power distributions of frequencies F1-F3 of the preamble or other portion of a received audio transmission (e.g., a portion that was originally transmitted to have the characteristics discussed above regarding FIG. 7).

The frequency magnitude plot 800 depicts power distributions at times T1-T6 for the frequencies F1-F3 of the preamble of the received audio transmission. In particular, the line 802 depicts the power distribution of frequency F1, the line 804 depicts the power distribution of frequency F2, and the line 806 depicts the power distribution of frequency F3. Although not depicted for clarity, similar power distributions may also be determined for frequencies F4-F6 of the preamble. As can be seen, frequency F1 has a maximum magnitude M1 at time T1, frequency F2 has a maximum magnitude M2 at time T2, and frequency F3 has a maximum magnitude M3 at time T3. The maximum magnitude M1 of frequency F1 is less than the maximum magnitude M2 of frequency F2, which is less than the maximum magnitude M3 of frequency F3. This may be caused by sources of interference that interfere differently with sound waves of different frequencies and/or caused by different transmitting characteristics at different frequencies for a transmitter transmitting the audio transmission including the preamble. For example, higher frequencies may attenuate more than lower frequencies and/or may be transmitted by a transmitter with lower magnitudes than lower frequencies. With reference to FIG. 7, frequency F1 is higher than frequencies F2, F3 and may therefore attenuate more than the frequencies F2, F3, resulting in a lower maximum magnitude M1 lower than the maximum magnitudes M2, M3. Frequency F2 is higher than frequency F3 and may therefore attenuate more than the frequency F3, resulting in a maximum magnitude M2 lower than the maximum magnitude M3.

The sources of interference may interfere similarly with both the preamble and the remaining portions of an audio transmission. Therefore, the attenuation of the preamble can be used as an indication of the attenuation of the remainder of the audio transmission and therefore to correct the audio transmission. For example, to normalize the relative magnitudes of the frequencies F1-F3, occurrences of the frequencies F1-F3 within the audio transmission may be divided by the corresponding maximum magnitudes M1-M3 in the preamble. In certain implementations, other types of magnitudes may be utilized to normalize the relative magnitudes of the frequencies F1-F3. For example, occurrences of the frequencies F1-F3 within the audio transmission may be divided by the average magnitudes of the power distributions associated with each frequency.

The times at which the maximum magnitudes M1-M3 of the power distributions for each of the frequencies F1-F3 occur may also be compared to expected times at which the maximum magnitudes M1-M3 will occur. In particular, interference during transmission of the audio transmission may cause one or more of the predetermined frequencies to be delayed. Therefore, the relative timing of the maximum magnitude M1-M3 of each frequency F1-F3 may differ depending on the frequency F1-F3. In particular, certain frequencies F1-F3 may arrive out of sequence (e.g., later or earlier than expected as compared to other frequencies F1-F3). A computing device receiving the audio transmission may therefore compare the time at which the maximum magnitude M1-M3 of each frequency F1-F3 occurs to an expected time of the maximum magnitude for the frequency occurring. The expected time may be determined based on the time of receipt of the audio transmission and/or the time at which a preamble of the audio transmission begins. If the computing device detects a difference between the time at which a maximum magnitude M1-M3 of a frequency F1-F3 occurs and a time at which the maximum magnitude M1-M3 of the frequency F1-F3 is expected to occur, the computing device may determine that the frequency is delayed or advanced due to interference and may adjust the processing of the audio transmission to account for the time difference (e.g., by searching for frequencies at delayed or advanced times determined based on the time difference) and/or correct the time difference within the audio transmission.

The power distributions of the frequencies F1-F3 may be calculated at each time by a frequency filter corresponding to the frequencies F1-F3. For example, a separate filter may be used to calculate the power distribution for each of the frequencies F1-F3. In particular, the frequency filter for each frequency may be implemented as a corresponding Goertzel filter configured to determine the power distribution of the frequencies F1-F3 at each time T1-T6. In additional or alternative implementations, other techniques may be used, such as performing Fourier Transforms (e.g., Fast Fourier Transforms) for the signals at each time T1-T6.

Figure 9B:
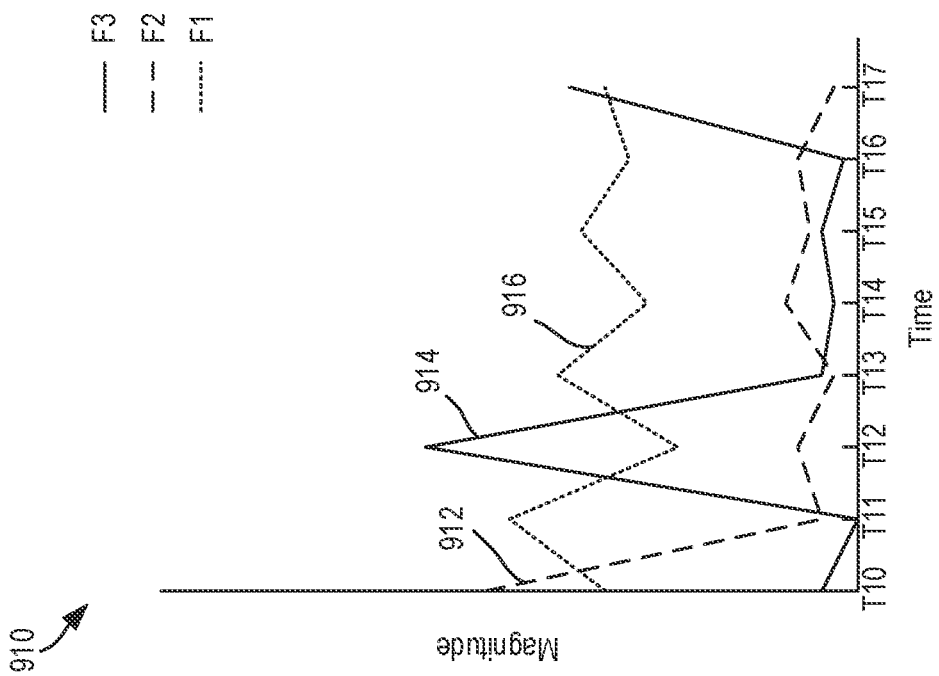
FIGS. 9A-9B illustrate frequency magnitude plots of an audio transmission according to an exemplary embodiment of the present disclosure.
Figure 9A:
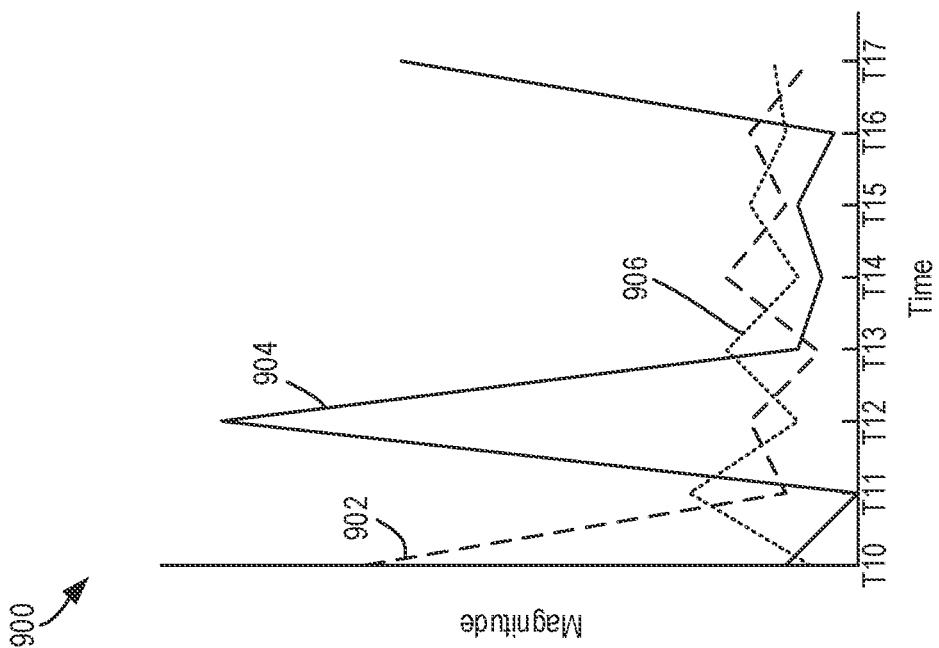

FIGS. 9A-9B illustrate frequency magnitude plots 900, 910 of an audio transmission according to an exemplary embodiment of the present disclosure. The frequency magnitude plots 900, 910 may depict equalization of another portion of a received audio transmission based on the preamble of the received audio transmission. In particular, and with reference to FIG. 7, the frequency magnitude plots 900, 910 may depict equalization of a different portion of a received audio transmission based on maximum magnitudes M1-M3 of frequencies F1-F3 of the preamble or another portion of the received audio transmission. For example, the frequency magnitude plot 900 may correspond to a different portion of the audio transmission before equalization, while the frequency plot 910 may correspond to the different portion of the audio transmission after equalization.

The frequency magnitude plots 900, 910 depict power distributions of the frequencies at times T10-T17. Referring to FIG. 2, the times T10-T17 may correspond to symbols S10-S17 of a payload 204 of a received audio transmission 200. Returning to FIG. 9, line 902 depicts the power distribution of frequency F2, line 904 depicts the power distribution of frequency F3, and line 906 depicts the power distribution of frequency F1. The line 906 has smaller magnitudes when compared to lines 902, 904. As explained above in connection with FIG. 8, the smaller magnitudes may result from comparatively higher interference for frequency F1, which is higher than frequencies F2, F3 and may therefore attenuate more. This type of interference may reduce the quality of the received audio transmission. For example, at time T11, frequency F1 is the strongest received frequency, but is only slightly higher than frequency F2 at time T11. By contrast, at time T10, the frequency F2 is the strongest received frequency and has a power much higher than the other frequencies F1, F3. Similarly, at times T12, T17, the frequency F3 is the strongest received frequency and has a power much higher than the other frequencies F1, F2. Subsequent processing may assume that the strongest received frequency at times T10-T17 is much higher (e.g., two or three times higher) than other frequencies. Therefore, the comparatively lower magnitude of frequency F1 at time T11 may cause errors in subsequent processing of the received audio transmission. This problem similarly occurs at times T13-T16, where frequencies F1-F3 all have relatively low magnitudes.

To correct this type of interference, a computing device receiving the audio transmission may normalize the power distributions of the frequencies F1-F3 based on the preamble or other portion. For example, and referring to FIG. 8, the computing device may normalize the power distributions of the frequencies F1-F3 based on maximum magnitudes M1-M3 of the frequencies F1-F3 in the preamble of the audio transmission. In particular, the computing device may divide the magnitude of the power distribution for each frequency F1-F3 by the corresponding maximum frequency M1-M3 at each time T10-T17.

The frequency distribution plot 910 depicts equalized power distributions of the frequencies F1-F3 for the times T10-T17. In particular, line 912 depicts the equalized power distribution of frequency F2, the line 914 depicts the equalized power distribution of frequency F3, and the line 916 depicts the equalized power distribution of frequency F1. As illustrated, the maximum magnitudes of the equalized power distributions of the frequencies F1-F3 are closer in magnitude than in the frequency distribution plot 900. For example, at time T11, the magnitude of frequency F1 is much higher than the magnitudes of the frequencies F1, F3. Also, at times T13-T16, line 916 is now clearly higher than lines 912, 914, indicating that the frequency F1 was transmitted with the strongest magnitude. As explained above, the increase in the magnitude of frequency F1 relative to the other frequencies F2, F3 may improve further processing of the audio transmission. Also, at time T14 in the frequency distribution plot 900, the magnitude of frequency F1 is lower than the magnitude of the other frequencies F2, F3. However, once equalized in the frequency plot 910, the magnitude of frequency F1 is higher than the magnitude of the other frequencies F2, F3. Accordingly, such normalization may help account for interference that attenuates certain frequencies more, causing the frequencies to have smaller magnitudes when received than other frequencies, even when the attenuated frequencies are the strongest when transmitted.

Figure 10:
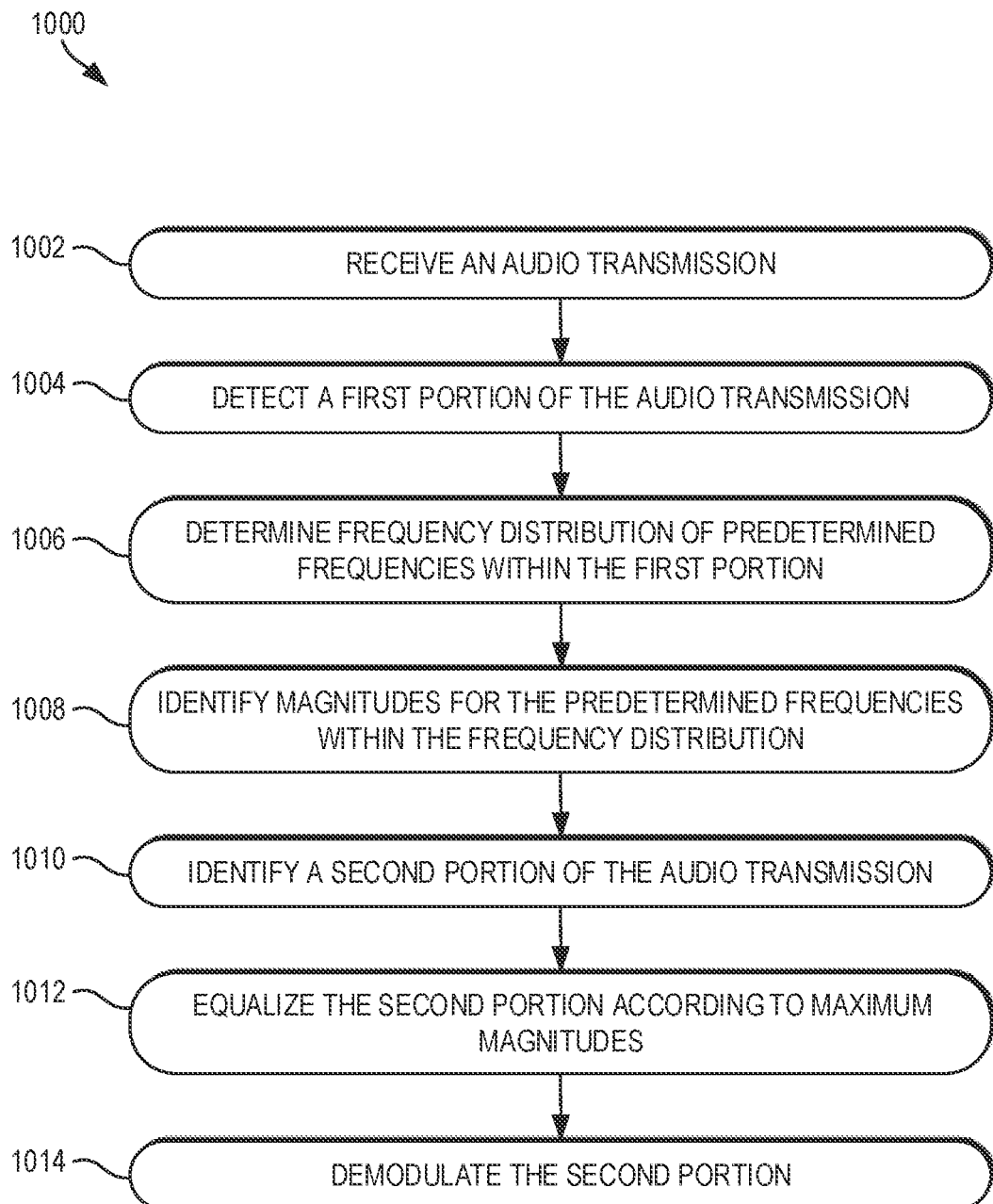
FIG. 10 illustrates a method according to an exemplary embodiment of the present disclosure.

FIG. 10 illustrates a method 1000 according to an exemplary embodiment of the present disclosure. The method 1000 may be performed to process a received audio transmission. The method 1000 may be implemented on a computer system, such as the system 100. For example, the method 1000 may be implemented by a computing device 102, 104. The method 1000 may also be implemented by a set of instructions stored on a computer readable medium that, when executed by a processor, cause the computer system to perform the method. Although the examples below are described with reference to the flowchart illustrated in FIG. 10, many other methods of performing the acts associated with FIG. 10 may be used. For example, the order of some of the blocks may be changed, certain blocks may be combined with other blocks, one or more of the blocks may be repeated, and some of the blocks described may be optional.

The method 1000 begins with receiving an audio transmission (block 1002). For example, and referring to FIG. 1, a computing device 102, 104 may receive an audio transmission 114, 116 at a receiver 110, 112. Returning to FIG. 10, a first portion of the audio transmission may then be identified (block 1004). The first portion of the audio transmission may include one or more predetermined frequencies that are produced at predetermined times or in a predetermined order. In certain implementations, the first portion may be detected at the beginning of an audio transmission. For example, the first portion of an audio transmission may be identified as the preamble of the audio transmission, as discussed above. In other implementations, the first portion may occur in another portion of the audio transmission (e.g., the beginning of a header of the audio transmission). For example, the first portion may be identified as a training sequence of frequencies that occurs after the preamble. In another example, the training sequence may occur in still further portions of the audio transmission, such as at the end of the audio transmission or in the middle of the transmission. The training sequence may include predetermined frequencies occurring at predetermined times, similar to the preamble discussed above in connection with FIG. 7. In certain implementations, training sequences of predetermined frequencies may be preferable to using the preamble of an audio transmission because training sequences may be configured to include additional frequencies. For example, where the predetermined frequencies of the preamble includes only a subset of the frequencies used to modulate data in the audio transmission, a training sequence may be included in the audio transmission to include all of the frequencies used to modulate data in the audio transmission, or a larger subset of the frequencies used to modulate data in the audio transmission. In further implementations, the audio transmission may not include a preamble or may include a preamble that does not includes multiple predetermined frequencies. In such implementations, a training sequence may be included with at least a subset of the frequencies used to modulate data for the audio transmission.

A frequency distribution of the first portion may then be determined (block 1006). The frequency distribution may be calculated for predetermined frequencies that the first portion is generated to include. For example, and referring to FIG. 8, where the first portion is the preamble of the audio transmission, a frequency distribution 800 may be generated to include power distribution of frequencies F1-F3 included within the preamble. As explained above, the frequency distribution 800 may be generated using one or more frequency filters. In particular, separate power distributions may be calculated for each frequency F1-F3, as indicated by the lines 802, 804, 806. Returning to FIG. 10, magnitudes may then be identified for the predetermined frequencies (block 1008). For example, and referring to FIG. 7, the computing device 102, 104 that received the audio transmission may identify, for each predetermined frequency F1-F3, of the first portion of the audio transmission, a maximum magnitude M1-M3 within a power distribution corresponding to the predetermined frequency F1-F3 (e.g., indicated by the lines 802, 804, 806).

A second portion of the audio transmission may then be identified (block 1010). The second portion of the audio transmission may be identified as a portion of the audio transmission other than the first portion identified at block 1004. For example, the second portion of the audio transmission may include one or more of a payload, header, and/or packet included within the audio transmission. The second portion may then be equalized according to the maximum magnitudes of the predetermined frequencies (block 1012). For example, and referring again to FIG. 8, the computing unit may equalize the second portion of the audio transmission using the maximum magnitudes M1-M3 of the power distributions of the predetermined frequencies F1-F3 within the preamble of the audio transmission that is received. As further shown in FIGS. 9A-9B, equalizing the second portion of the audio transmission may increase the magnitude of the power distributions of certain frequencies F1 relative to other frequencies F2, F3 and may decrease the magnitude of the power distributions of still further frequencies F3 relative to other frequencies F1, F2. Equalizing the second portion of the audio transmission may increase the accuracy of subsequent processing of the second portion by increasing the difference in magnitude of the strongest frequency at each time within the second portion, making it clearer which frequency is the strongest at each time.

In certain implementations, the second portion of the audio transmission may utilize frequencies to modulate transmitted data that differ at least in part from the predetermined frequencies of the first portion of the audio transmission. For example, the second portion may modulate transmitted data using a frequency that is between two predetermined frequencies. In such instances, the frequencies that differ from the predetermined frequencies may be equalized using magnitudes interpolated from the maximum magnitudes of the predetermined frequencies. Continuing the previous example, the frequency that is between two predetermined frequencies may be equalized using a magnitude interpolated from the magnitudes associated with the two predetermined frequencies (e.g., a weight calculated as an average of the maximum magnitudes associated with the two predetermined frequencies).

Other strategies may also be used to equalize the second portion of the audio transmission based on the maximum magnitudes of the predetermined frequencies within the first portion of the audio transmission. For example, a trend may be determined between the maximum magnitudes of the predetermined frequencies within the first portion of the audio transmission. The second portion of the audio transmission may then be normalized using magnitudes identified based on the trend. For example, for each frequency used to transmit data within the second portion of the audio transmission, the computing unit may identify a corresponding magnitude from the trend and may use the identified magnitude to equalize the magnitudes of occurrences of the frequency within the second portion of the audio transmission.

In addition to equalizing the second portion of the audio transmission, one or more frequency-dependent time errors may be detected and corrected. For example, as discussed above in connection with FIG. 8, the time at which a maximum magnitude for each of the predetermined frequencies occurs in the first portion may be compared to an expected time of occurrence for each of the predetermined frequencies. If a difference is detected between the time of occurrence and expected time of occurrence, a time error may be detected. In addition to equalizing the second portion, timing information associated with predetermined frequencies having a time error may be adjusted to account for the time error. For example, if the time error indicates that the maximum magnitude of a first frequency occurred later than expected by 0.2 milliseconds, timing information associated with the first frequency may be adjusted to occur 0.2 milliseconds earlier in the second portion of the audio transmission, or occurrences of the first frequency may be searched for 0.2 milliseconds later than expected. As another example, if the time error indicates that the maximum magnitude of a second frequency occurred earlier than expected by 0.5 milliseconds, timing information associated with the second frequency may be adjusted to occur 0.5 milliseconds later in the second portion of the audio transmission, or occurrences of the second frequency may be searched for 0.5 milliseconds earlier than expected.

The second portion of the audio transmission may then be demodulated (block 1014). For example, the computing unit that received the audio transmission may demodulate the second portion of the audio transmission that was equalized at block 1012 to extract data (e.g., a header and/or packet) from the audio transmission. The demodulated second portion of the audio transmission may then be subsequently processed according to one or more applications or other purposes (e.g., to process a payment, determine a device location, exchange information).

The method 1000 may be performed to equalize portions of received audio transmissions prior to demodulation. Equalizing these portions of the audio transmission may account for or otherwise minimize the effects of interference that can affect different frequency components of the audio transmissions and thereby improve the accuracy of data extracted from the audio transmissions. Accordingly, the method 1000 may improve the accuracy of data transmitted by audio, which can lead to further operational benefits. For example, by improving accuracy of data extracted from audio transmissions, the method 1000 may reduce the number of audio transmissions that have to be repeated in response to interference rendering received audio transmissions inaccurate. As another example, by improving accuracy, the method 1000 may reduce the error checking processes and mechanisms that are required. In particular, the increased accuracy may reduce the necessity of including additional error checking mechanisms (e.g., checksum digits, parity bits) in the audio transmission, reducing overhead for the audio transmissions and freeing additional symbols within the audio transmission for increased data throughput.

In certain implementations, the method 1000 may be performed at least in part to equalize more than one audio transmission. For example, a first computing device may receive multiple audio transmissions from a second computing device, and only one of the audio transmissions may include the first portion with predetermined frequencies (e.g., a "training sequence"). Blocks 1004-1008 may be performed on the audio transmission including the training sequence to identify the magnitudes of the predetermined frequencies. Blocks 1010-1014 may then be repeated to process the audio transmissions (e.g., to equalize and demodulate the payload of each of the audio transmissions received from the second computing device). Such configurations may reduce the overhead required to detect and correct frequency-dependent interference with the audio transmission.

Turning now to the problems caused by phase-shifting forms of audio interference, when data is transmitted using sound waves (e.g., using audio transmissions), movements of one or both of a transmitting and a receiving computing device may degrade the received sound waves. In particular, movements of the transmitting and/or receiving computing device may cause phase shifts within audio transmission, which can interfere with the synchronization and subsequent processing of the audio transmission, including extraction of data from the audio transmission.

Therefore, there exists a need to identify and correct phase shifting distortions for audio transmissions. One solution to this problem is to measure differences between a first portion of an audio transmission and a corresponding, predetermined audio sequence. For example, phase differences between the first portion of the audio transmission and the predetermined audio sequence may be measured to estimate a movement speed between a transmitter and a receiver of the audio transmission. A second portion of the audio transmission, such as a payload of the audio transmission, may be corrected based on the estimated movement speed between the transmitter and the receiver. In this way, the computing device that receives the audio transmission can properly account for phase shifts and/or time delays of received audio transmissions. Furthermore, because the correction is performed by the computing device receiving an audio transmission, these techniques can account for interference and disturbances that occur during or after transmission of the audio transmission without requiring special processing by the computing device that transmits the audio transmission.

Figure 11:
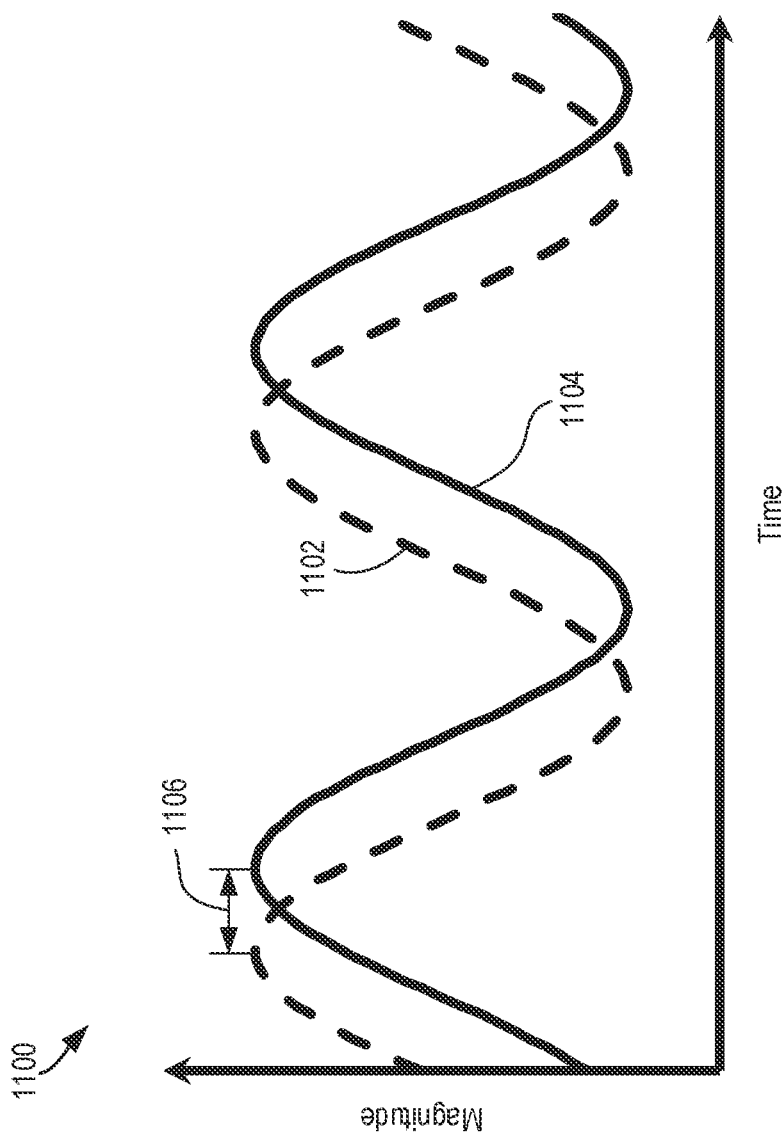
FIG. 11 illustrates a plot of phase shifted audio transmissions according to an exemplary embodiment of the present disclosure.

FIG. 11 illustrates a plot 1100 of phase shifted audio transmissions according to an exemplary embodiment of the present disclosure. The plot 1100 includes signals 1102, 1104, which may correspond to two different signals. In particular, the signals 1102, 1104 may correspond to symbols of an audio transmission. For example, the signal 1102 may represent an expected signal contained by a symbol of an audio transmission (e.g., the preamble or other training sequence of the audio transmission) and the signal 1104 may represent a received audio signal contained by the symbol of the audio transmission (e.g., the audio signal as actually received by a receiving computing device).

As depicted, both signals 1102, 1104 have the same frequency. However, the signal 1104 occurs after signal 1102 (i.e., the signal 1104 is phase shifted relative to the signal 1102). In particular, the signal 1104 is delayed by a phase shift 1106 relative to the signal 1102. As explained above, the phase shift 1106 may be caused by movement between a transmitter and a receiver of the audio transmission. In particular, if the transmitter is moving away from the receiver and/or if the receiver is moving away from the transmitter, a phase shift 1106 resulting in a delay of the signal 1104 may occur.

Other types of phase shifts may also occur. For example, in other instances, a phase shift may result in the signal 1104 occurring before the signal 1102. For example, if the computing device transmitting the audio signal moves toward the computing device receiving the audio signal and/or the computing device receiving the audio signal moves toward the computing device transmitting the audio signal, a phase shift may result that causes the signal 1104 to occur earlier than the signal 1102.

Figure 12:
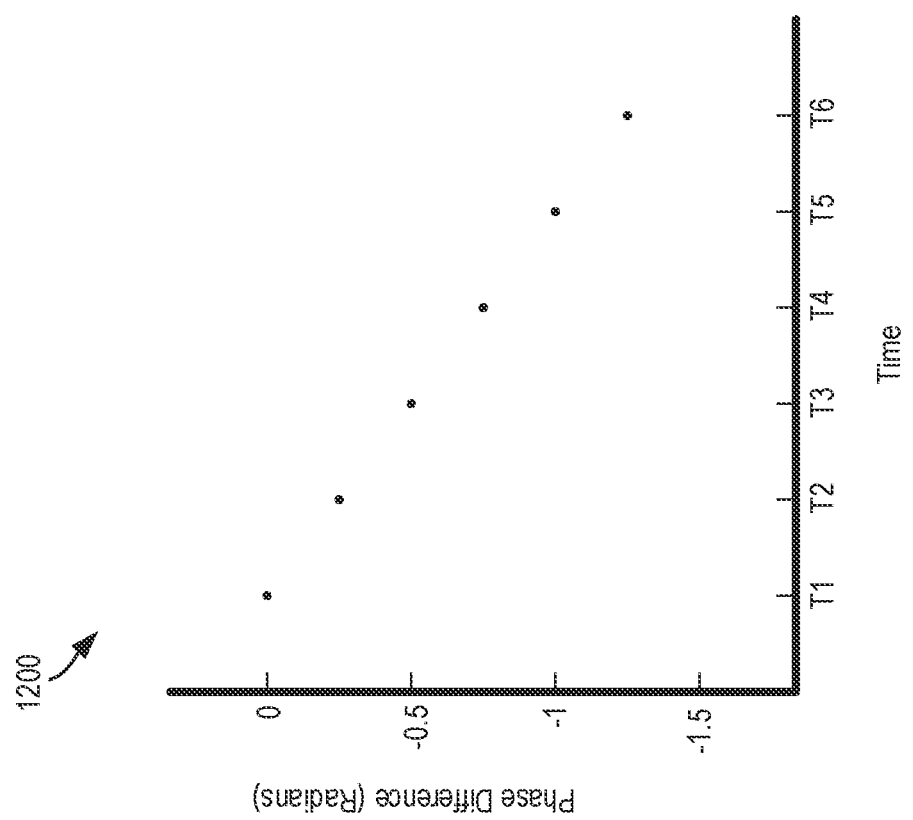
FIG. 12 illustrates a plot of a preamble according to an exemplary embodiment of the present disclosure.

As explained above, phase shifts may be used to encode information in audio transmissions. Phase shifts may similarly be used in the symbols of the preamble of audio transmissions. For example, FIG. 12 illustrates a plot 1200 of desired phase differences for a preamble according to an exemplary embodiment of the present disclosure. Referring to FIG. 2, the preamble may correspond to a preamble 202 of an audio transmission 200 transmitted by a computing device. The plot 1200 indicates the relative phase differences between signals received at multiple times within an audio transmission (e.g., within the preamble of a received audio transmission). The times T1-T6 may correspond to symbols of a received audio transmission. For example, and referring again to FIG. 2, the times T1-T6 may correspond to the symbols 1-6 of the preamble 202.

When an audio transmission is initially transmitted, each time T1-T6 may correspond to a signal with a corresponding, predetermined phase difference (e.g., a phase difference caused by a phase shift relative to the first symbol of the preamble). The plot 1200 indicates these phase differences at times T1-T6 corresponding to the symbols 1-6. In particular, the plot 1200 indicates the phase differences (in radians) relative to the phase of the signal received at time T1. As depicted, the signals received at times T1-T6 have phase differences that decrease. Namely, the phase differences decrease by 0.25 radians for each subsequent time T1-T6 (e.g., for subsequent symbols) and decrease from a phase difference of 0 radians at time T1 to a phase difference of −1.25 radians at time T6. These phase differences may be predetermined (e.g., predetermined to indicate the presence of an audio transmission).

As depicted, the preamble includes six predetermined phase differences that decrease in frequency from time T1 to time T6. However, other configurations may include additional or fewer predetermined signals with phase differences (e.g., additional or fewer symbols in the preamble). Further, the predetermined phase differences may follow alternative patterns. In particular, other implementations may include predetermined phase differences that increase in frequency over time, or that follow any other pattern or progression over time. Also, the depicted plot 1200 may correspond to a portion of the audio transmission other than the preamble, such as a portion of the header of the audio transmission.

In still further embodiments, rather than containing symbols with known phase differences of the audio carrier signal, the preamble may include symbols containing corresponding, predetermined frequencies. For example, each time T1-T6 may correspond to known frequencies for the corresponding symbols 1-6. The frequencies for the symbols of the preamble may correspond to a known pattern of the preamble (e.g., descending frequencies, ascending frequencies, and/or another frequency patterns).

To account for movement of one or both of the receiving computing device and the transmitting computing device, computing devices receiving audio transmissions may estimate a movement speed between the transmitting and receiving computing devices. To do so, computing devices receiving audio transmissions may, determine a phase shift of one or more symbols of the audio transmission.

Figure 13:
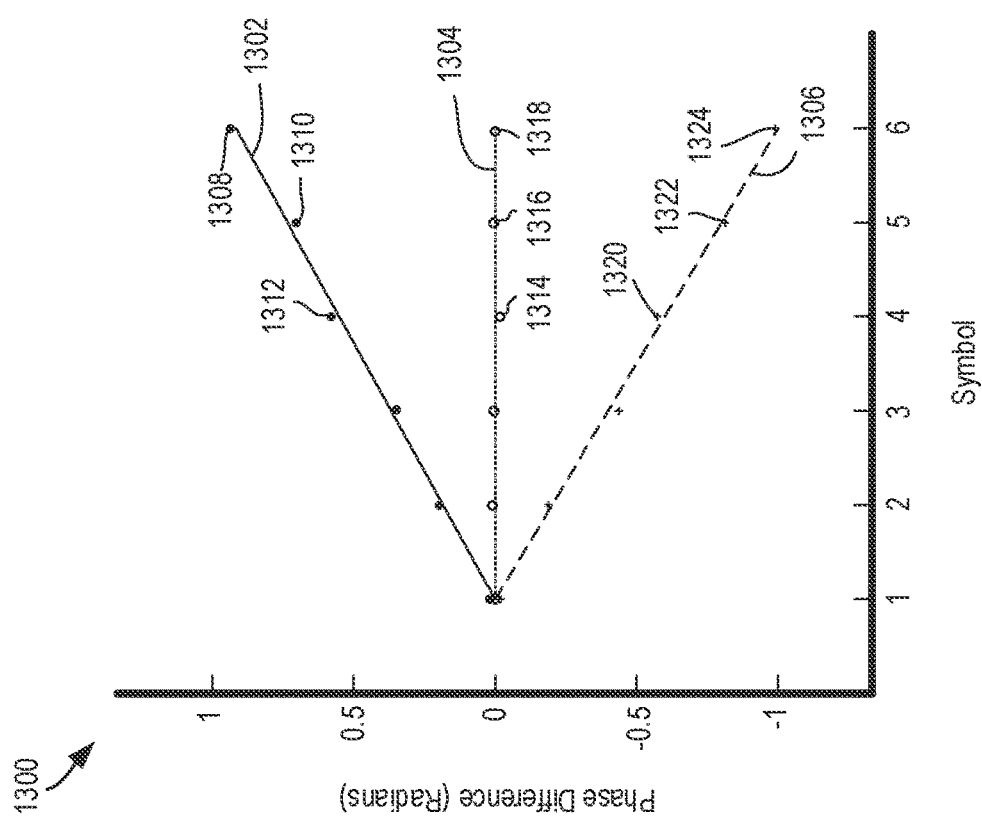
FIG. 13 illustrates a plot of phase differences according to an exemplary embodiment of the present disclosure.

Phase shifts such as the phase shift 1206 may occur for multiple symbols in an audio transmission. For example, FIG. 13 illustrates a plot 1300 of phase differences according to an exemplary embodiment of the present disclosure. The plot 1300 includes lines 1302, 1304, 1306 that correspond to audio transmissions with different movement speeds. For example, the line 1302 may correspond to an audio transmission where the transmitter is moving away from the receiver and/or where the receiver is moving away from the transmitter. The line 1304 may correspond to an audio transmission with minimal movement of the transmitter and receiver. The line 1306 may correspond to an audio transmission where the transmitter is moving toward the receiver and/or where the receiver is moving toward transmitter.

The plot 1300 depicts changes in the phase differences for six symbols of the audio transmissions and different scenarios, each scenario corresponding to a line 1302, 1304, 1306. The six symbols may correspond to a preamble of the audio transmission, such as symbols 1-6 of the preamble 202. The six symbols may also correspond to another portion of the audio transmission, such as a training sequence or other expected sequence within the audio transmission. The phase differences may be measured by comparing received signals for the symbols of the audio transmission to expected signals for the symbol of the audio transmission (e.g., to an expected phase of a signal of the symbol of the preamble 202). For example, the phase differences for the lines 1302, 1304, 1306 may be determined by comparing received audio transmissions to expected audio transmissions, similar to determining the phase shift 1106 of the plot 1100. In particular, the phase differences for the lines 1302, 1304, 1306 may be determined by comparing the phases of signals received for each symbol to expected phases for the symbol (e.g., expected phases and/or phase differences, such as the phase differences indicated in the plot 1200). The phase differences as depicted in the plot 1300 are measured in radians, where 27L radians represents a complete cycle of the signal (e.g., a peak-to-peak cycle of the signal. The phase differences may additionally or alternatively be measured according to other units. For example, the phase differences may be measured as a time difference between the expected signal (e.g., the signal 1202) and the received signal (e.g., 1204). Positive phase differences may indicate delays (e.g., where the received audio transmission occurs later than the expected audio transmission), while negative phase difference may indicate the received audio transmission occurs before the expected audio transmission.

As shown, when the transmitter or receiver moves, the phase shift may change between symbols of the auditory transmission. For example, the phase differences for the audio transmission corresponding to line 1302 increase for subsequent symbols of the audio transmission. In particular, the phase differences for the line 1302 increase from about zero radians for the first symbol to about one radian for the sixth symbol. As another example, the phase differences for the audio transmission corresponding to the line 1306 decrease for subsequent symbols. In particular, the phase differences for the line 1306 decrease from about zero radians for the first symbol to about negative one radians for the sixth symbol. By contrast, the line 1304 does not indicate a significant change in phase difference for subsequent symbols.

Accordingly, changes in phase difference between symbols of an audio transmission may indicate movement of one or both of the transmitter and the receiver. For example, the line 1302 indicates increasing phase differences and is associated with an audio transmission involving a transmitter moving away from a receiver and/or a receiver moving away from a transmitter of the audio transmission. Therefore, increases in phase differences may indicate such movements of the transmitter and/or receiver. As another example, the line 1306 indicates decreasing phase differences and is associated with an audio transmission involving a transmitter moving toward a receiver and/or a receiver moving toward a transmitter of the audio transmission. Therefore, decreases in phase difference may indicate such movements of the transmitter and/or receiver. Further, no or minimal changes to the phase difference may indicate minimal movement between the transmitter and receiver of an audio transmission. For example, the line 1304 indicates minimal changes in phase differences and corresponds to an audio transmission with minimal movement of the transmitter and/or receiver.

Additionally, the rate of change of phase differences between symbols of an audio transmission may also indicate a speed of movement. For example, larger changes of phase differences between symbols of an audio transmission may indicate faster movement. As a specific example, a line increasing from a phase difference of zero for the first symbol to a phase difference of 0.5 radians for the sixth symbol may correspond to a scenario with slower movement (e.g., slower movement of the transmitter and/or receiver of the audio transmission) than the audio transmission corresponding to the line 1302. As another example, a line decreasing from a phase difference of zero for the first symbol to a phase difference of −0.5 radians for the sixth symbol may correspond to a scenario with slower movement than the audio transmission corresponding to the line 1306.

The lines 1302, 1304, 1306 may be determined based on determined differences for symbols from received audio transmissions. For example, differences 1308, 1310, 1312, 1314, 1316, 1318, 1320, 1322, 1324 may be identified for the six symbols of received audio transmissions. Only a subset of the differences 1308, 1310, 1312, 1314, 1316, 1318, 1320, 1322, 1324 include corresponding reference numbers, but it should be understood that measurements may be made for all six symbols of the received transmissions. The line 1302, 1304, 1306 may then be identified based on the differences 1308, 1310, 1312, 1314, 1316,

1318, 1320, 1322, 1324 for the received transmission. For example, the line 1302, 1304, 1306 may be determined by finding a correlation (e.g., a line of best fit or other statistical correlation) for the differences 1308, 1310, 1312, 1314, 1316, 1318, 1320, 1322, 1324. The lines 1302, 1304, 1306 may then be utilized to determine whether the transmitter and/or receiver of an audio transmission moved.

Figure 14:
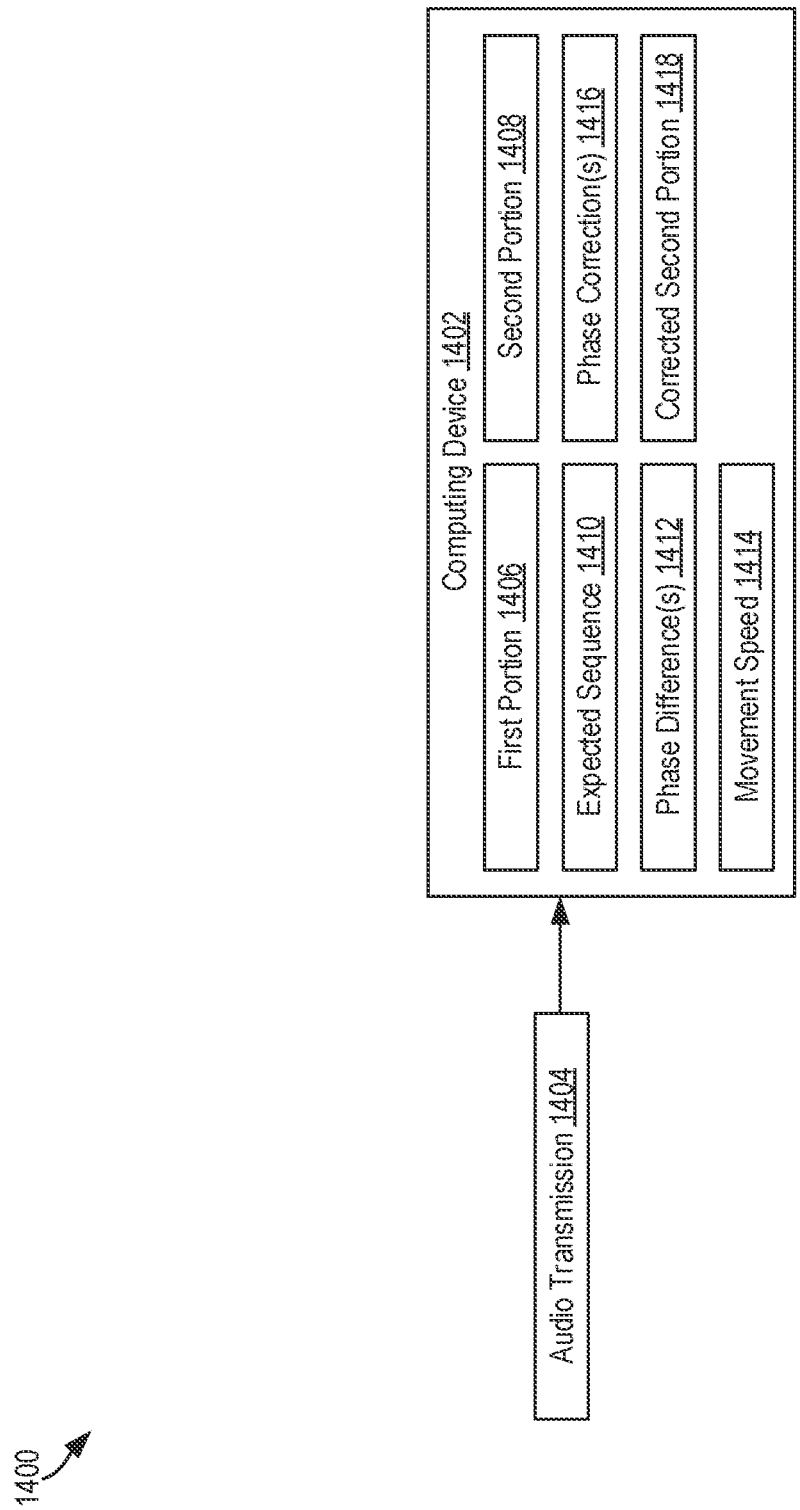
FIG. 14 illustrates a system according to an exemplary embodiment of the present disclosure.

FIG. 14 illustrates a system 1400 according to an exemplary embodiment of the present disclosure. The system 1400 may be configured to detect and correct for interference of audio transmissions resulting from movement of the transmitter and/or receiver of the audio transmission. The system 1400 includes a computing device 1402 and an audio transmission 1404. The computing device 1402 may receive the audio transmission 1404. For example, the computing device 1402 may be an exemplary implementation of one or both of the computing devices 102, 104 and may receive the audio transmission 1404 via a receiver 110, 112. The audio transmission 1404 may be generated to contain data, e.g., data encoded into one or more symbols of at least a portion of the audio transmission 1404. For example, the data may be contained in a packet included with the audio transmission 1404.

However, during transmission of the audio transmission 1404, the transmitter and/or receiver of the audio transmission 1404 may move relative to one another. In particular, the transmitter and/or receiver may move along an axis that connects the transmitter and receiver (e.g., may experience movement along a "line of sight" between the transmitter and the receiver). This type of movement may cause interference with the audio transmission 1404, which may result in, e.g., phase shifts for symbols of the audio transmission. These phase shifts may result in inaccuracies during subsequent processing of the audio transmission 1404 (e.g., subsequent demodulation and/or extraction of data stored within the audio transmission 1404). Therefore, to maximize the accuracy of such subsequent processing, it may be necessary to detect and correct for movement of the transmitter and/or receiver of the audio transmission.

To detect movement of transmitter and/or receiver, the computing device 1402 may identify a first portion 1406 of the audio transmission 1404. The first portion 1406 may be identified as a part of the audio transmission 1404 that corresponds to an expected sequence 1410. The expected sequence 1410 may contain one or more symbols that occur at known times and contain signals having a known frequency and/or phase. In particular, the expected sequence 1410 may contain signals that the first portion 1406 was generated to include (e.g., before transmission and reception of the audio transmission 1404). In certain implementations, the first portion 1406 may correspond to the preamble of the audio transmission 1404 and the expected sequence 1410 may contain the preamble as generated prior to transmission of the audio transmission. In additional or alternative implementations, the first portion 1406 may correspond to other parts of the audio transmission 1404. For example, the audio transmission 1404 may include one or more training sequences in addition or alternatively to the preamble. The training sequences may include symbols containing known frequencies at known phases. The training sequences may therefore be identified as the first portion 1406 of the audio transmission 1404.

The computing device 1402 may also identify one or more phase differences 1412 between the first portion 1406 and the expected sequence 1410. The computing device 1402 may identify the phase differences 1412 on a per-symbol basis. For example, the computing device 1402 may identify corresponding symbols of the first portion 1406 and the expected sequence 1410 and may identify the one or more phase differences 1412 between the corresponding symbols. The phase differences 1412 may be determined by comparing the signals of the corresponding symbols and determining an amount by which the phase of the symbol from the first portion 1406 differs from the phase of the symbol from the expected sequence 1410.

The computing device 1402 may also determine a movement speed 1414 between the transmitter and the receiver of the audio transmission 1404. For example, the movement speed 1414 may indicate whether the transmitter and/or receiver are moving closer together or whether the transmitter and/or receiver are moving farther apart. In particular, the movement speed 1414 may indicate whether the transmitter and/or receiver are moving closer together or farther apart along an axis connecting the transmitter and the receiver. The movement speed 1414 may also indicate an estimate of the magnitude of movement speed 1414 (e.g., how fast the transmitter and/or receiver are moving relative to one another) between the transmitter and the receiver of the audio transmission 1404. To determine the movement speed 1414, the computing device 1402 may analyze how the phase differences change between corresponding symbols of the first portion 1406 and the expected sequence 1410. For example, the computing device 1402 may determine that the transmitter and receiver are moving farther apart if the phase differences 1412 between the first portion 1406 and the expected sequence 1410 increase for subsequent symbols. As another example, the computing device 1402 may determine that the transmitter and receiver are moving closer together if the phase differences 1412 between the first portion 1406 and the expected sequence 1410 decrease for subsequent symbols. The computing device 1402 may further determine the magnitude of the movement speed 1414 based on the rate of change of the phase differences 1412. In particular, as further explained above, if the phase differences 1412 increase or decrease at a greater rate between the corresponding symbols of the first portion 1406 and the expected sequence 1410, the computing device 1402 may determine that the movement speed 1414 is larger (e.g., that the transmitter and/or receiver are moving faster relative to one another).

The computing device 1402 may also correct phase shifts within the audio transmission 1404. For example, the computing device 1402 may identify a second portion 1408 of the audio transmission 1404 and may correct phase difference of symbols within the second portion 1408. The second portion 1408 may include one or more portions of the audio transmission 1404 not included in the first portion 1406. For example, the second portion 1408 may include all or part of the payload of the audio transmission 1404. As another example, the second portion 1408 may be selected to include at least a portion of data included within the audio transmission. In certain implementations, the second portion 1408 may include all of the audio transmission 1404 (e.g., to correct phase shifts for the entire audio transmission 1404).

The computing device 1402 may calculate phase corrections 1416 for the second portion 1408. The phase corrections 1416 may be calculated to offset phase shifts within the second portion 1408 caused by movement of the transmitter and/or receiver of the audio transmission 1404. The phase corrections 1416 may therefore be calculated according to the movement speed 1414. As illustrated in FIG. 13, when the transmitter and/or receiver move further from one another, the phase differences 1412 increase for subsequent symbols within audio transmissions. When the transmitter and/or receiver are moving closer to one another, the phase differences decrease for subsequent symbols within audio transmissions. Therefore, depending on the type of movement speed 1414, the computing device 1402 may calculate the phase corrections 1416 to increase or decrease for subsequent symbols within the second portion 1408. In particular, if the movement speed 1414 indicates that the transmitter and/or receiver are moving further apart, the phase corrections 1416 may be calculated to increase across the symbols of the second portion 1408. Also, if the movement speed 1414 indicates that the transmitter and/or receiver are moving closer together, the phase corrections 1416 may be calculated to decrease across the symbols of the second portion 1408.

The computing device 1402 may then apply the phase corrections 1416 to the second portion 1408 to generate the corrected second portion 1418. The corrected second portion 1418 may represent a version of the second portion 1408 of the audio transmission 1404 that is corrected to remove phase shifts caused by movement of the transmitter and/or receiver of the audio transmission 1404. Because the phase shifts are removed in the corrected second portion 1418, the corrected second portion 1418 may represent a more accurate version of the second portion 1408 and may therefore be utilized for subsequent processing (e.g., processing to extract stored data and/or packets from the audio transmission 1404). To generate the corrected second portion 1418, the computing device 1402 may apply the phase corrections 1416 to the symbols of the second portion 1408. In applying the phase corrections 1416, the computing device 1402 may offset or otherwise adjust timing information of the signals contained by the symbols of the second portion 1408. For example, the computing device 1402 may identify a corresponding phase correction from the phase corrections 1416 for a symbol of the second portion 1408 and may apply the corresponding phase correction to the symbol by adjusting the timing information of the signal according to the corresponding phase correction. This procedure may be repeated for all or part of the symbols within the second portion 1408 to generate the corrected second portion.

The computing device 1402 may be implemented by a computing system. For example, although not depicted, the computing device 1402 may contain a processor and a memory that implement at least one operational feature of the computing device 1402. For example, the memory may contain instructions which, when executed by the processor, cause the processor to implement at least one operational feature of the computing device 1402.

Figure 15:
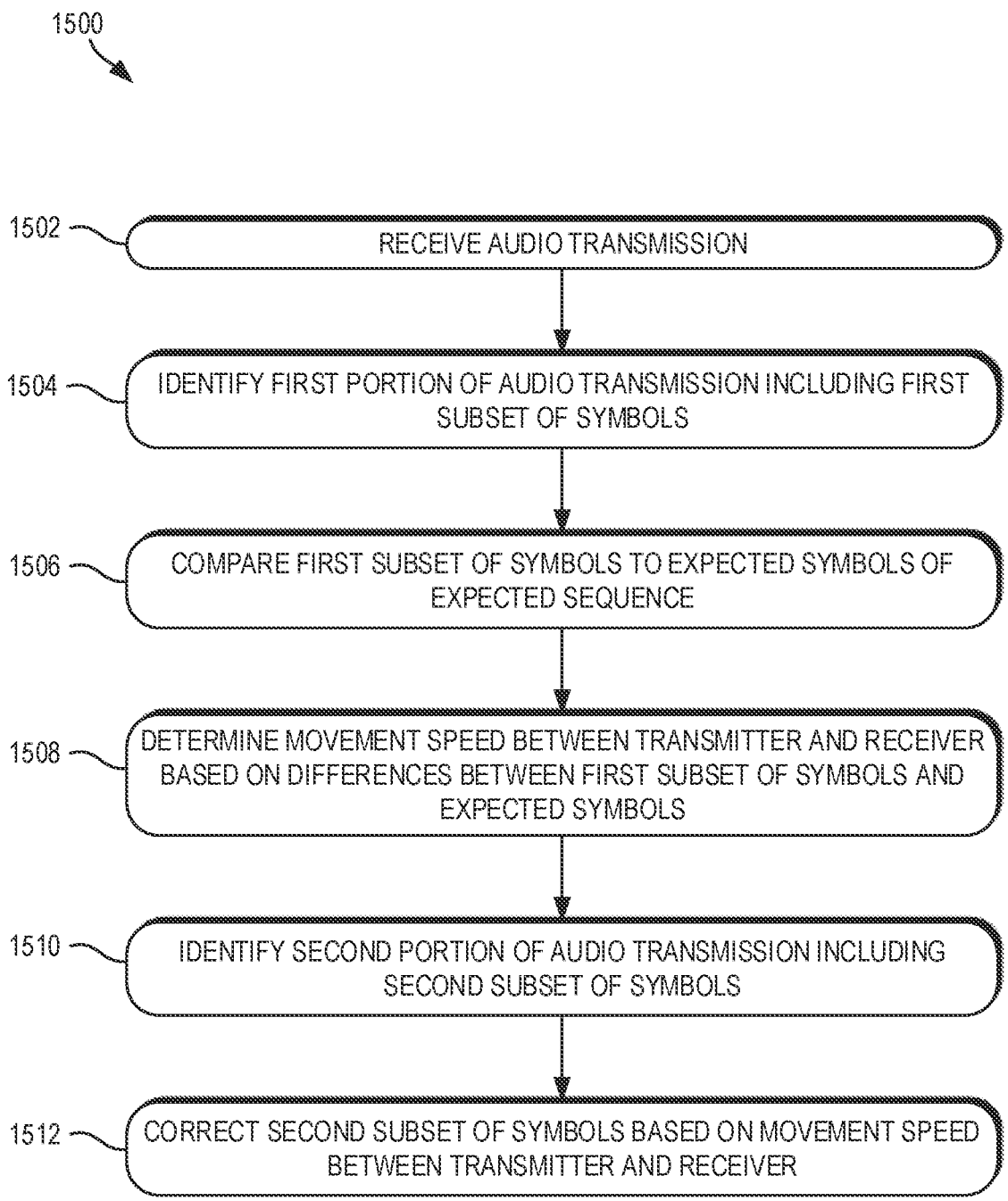
FIG. 15 illustrates a method according to an exemplary embodiment of the present disclosure.

FIG. 15 illustrates a method 1500 according to an exemplary embodiment of the present disclosure. The method 1500 may be performed to determine a movement speed of a transmitter and/or receiver of an audio transmission and to correct interference for at least a portion of the audio transmission caused by the movement of the transmitter and/or receiver. The method 1500 may be implemented on a computer system, such as the system 1400. For example, the method 1500 may be implemented by the computing device 1402. The method 1500 may also be implemented by a set of instructions stored on a computer readable medium that, when executed by a processor, cause the computer system to perform the method. For example, all or part of the method 1500 may be implemented by a CPU and a memory of the computing device 1402. Although the examples below are described with reference to the flowchart illustrated in FIG. 15, many other methods of performing the acts associated with FIG. 15 may be used. For example, the order of some of the blocks may be changed, certain blocks may be combined with other blocks, one or more of the blocks may be repeated, and some of the blocks described may be optional.

The method 1500 may begin with receiving an audio transmission (block 1502). For example the computing device 1402 may receive an audio transmission 1404 containing data. The audio transmission 1404 may include multiple symbols which contain symbols encoding or otherwise containing data and/or other information for transmission by the audio transmission 1404. A first portion of the audio transmission may be identified containing a first subset of symbols (block 1504). For example, the computing device 1402 may identify a first portion 1406 of the audio transmission 1404. The first portion 1406 may contain a first subset of the symbols of the audio transmission 1404. For example, the first subset of the symbols contained by the first portion 1406 may correspond to a known set of symbols. In particular, the first portion 1406 may have initially been generated (e.g., before transmission) to be identical to or to resemble an expected sequence 1410 containing expected symbols that are known prior to receiving the audio transmission 1404. For example, the expected sequence 1410 may be the same for each received audio transmission 1404 and/or may change according to a known pattern for each received audio transmission 1404. Accordingly, the computing device 1402 may store a copy of the expected sequence 1410 corresponding to the first portion 1406.

The first subset of the symbols may be compared to the expected symbols of the expected audio sequence (block 1506). For example, the computing device 1402 may compare the first subset of symbols from the first portion 1406 to the expected symbols of the expected sequence 1410. In comparing the first subset of symbols to the expected symbols, the computing device 1402 may identify one or more differences between the first subset of symbols and the expected symbols. In particular, the computing device 1402 may compare symbols from the first subset of symbols to corresponding symbols from the expected symbols and may identify one or more differences between the symbols of the received audio transmission and the corresponding symbols from the expected symbols. In certain implementations, the differences may include phase differences between the first subset of symbols and the expected symbols. Further details regarding comparisons between the first subset of symbols and the expected symbols are discussed below in connection with the method 1600 and FIG. 16.

A movement speed between the transmitter and receiver of the audio transmission may then be identified based on the differences between the first subset of symbols and the expected symbols (block 1508). As explained above, the differences between the first subset of symbols and the expected symbols may include phase differences between the first subset of symbols and the expected symbols and may therefore indicate phase shifts during transmission of the audio transmission 1404. As explained above, the phase shifts may be caused by movement between the transmitter and receiver (e.g., the transmitter and/or receiver moving further away from or closer to one another). In particular, such phase shifts may be caused by movement of the transmitter and/or receiver along an axis connecting the transmitter and receiver (e.g., "line of sight" movement of the transmitter and/or receiver).

Changes in the phase differences for subsequent symbols of the first subset of symbols and the expected symbols may therefore indicate movement of the transmitter and/or receiver. Therefore, the computing device 1402 may analyze changes in the phase differences for subsequent symbols to determine the movement speed. In particular, the computing device 1402 may identify a correlation for the phase differences, such as the lines 1302, 1304, 1306, and may identify phase drifts between the symbols as changes to the phase differences between the symbols. The computing device may then use the rate of change (e.g., the slope) of the correlation to determine the movement speed 1414 of the transmitter and/or receiver. In particular, if Δθ represents the phase drift per symbol, the velocity may be determined as as $$v = \frac{\Delta\theta}{2\pi}\lambda/T_{symbol},$$

where λ represents the wavelength of the carrier signal of the audio transmission 1404 and $T_{symbol}$ represents the duration of each symbol. For example, as depicted, the phase drift Δθ for line 1302 is about 0.15 radians/symbol. The duration of each symbol $T_{symbol}$ may be 2 ms and, assuming a 18.6 kHz carrier frequency, the carrier signal wavelength is about 0.7 inches. In such a scenario, the velocity may be determined as $$v = \frac{0.15}{2\pi} 0.7 \text{ in}/2 \text{ ms} \cong 11.1 \text{ in/sec}.$$

As explained further above, a positive movement speed 1414 may indicate that the transmitter and/or receiver of the audio transmission 1404 are moving further from one another and a negative movement speed 1414 may indicate that the transmitter and/or receiver of the audio transmission 1404 are moving closer to one another.

A second portion of the audio transmission may then be identified (block 1510). For example, the computing device 1402 may identify a second portion 1408 of the audio transmission 1404. The second portion 1408 of the audio transmission may include a second subset of symbols of the audio transmission 1404. The second subset of symbols may differ at least in part from the first subset of symbols. As explained further above, the second portion 1408 may correspond to a portion of the audio transmission 1404 containing data for transmission. For example, the second portion 1408 may contain a packet of data for transmission by the audio transmission 1404. Other implementations for selecting the second portion 1408 are discussed above.

The second subset of symbols may be corrected based on the movement speed between the transmitter and receiver (block 1512). For example, the computing device 1402 may correct the second subset of symbols based on the movement speed 1414. In particular, the computing device 1402 may correct the second subset of symbols by determining the different phase shifts for each symbol caused by the movement speed 1414 of the transmitter and/or receiver (e.g., the changed phase shift for the second subset of symbols). For example, the computing device 1402 may determine phase corrections 1416 for the second subset of symbols. The phase corrections 1416 may be determined based on the phase drift Δθ of the phase differences 1412.

For example, to determine the phase corrections 1416, the computing device 1402 may project the phase differences 1412 of the first subset of symbols for other symbols within the audio transmission 1404 (e.g., earlier and/or later symbols within the audio transmission 1404). For example, where the first portion 1406 is the preamble of the audio transmission 1404 (e.g., symbols 1-6 of the audio transmission), the second portion may include the payload of the audio transmission 1404 (e.g., symbols 7-24 of the audio transmission). To determine the phase corrections 1416, the computing device 1402 may project the phase differences 1412 of the first subset of symbols 1-6 to the second subset of symbols 7-24. In certain implementations, the projection may be based on the correlation of the differences between the first subset of symbols and the expected symbols (e.g., the phase drift). For example, the computing device 1402 may determine a phase difference, indicated by the correlation phase drift with for the first symbol (e.g., the symbol 7). The phase correction 216 may then be identified to undo the phase difference. For example, the phase correction 216 may be identified as the opposite of the identified phase shift. As a specific example, if the phase difference of the symbol 7 is 1.2 radians, the phase correction 216 of the symbol may be −1.2 radians. The phase corrections 1416 for subsequent symbols (e.g., symbols 8-24) may be determined based on the phase correction 1416 for the first symbol and the phase drift Δθ between consecutive symbols (e.g., so that the phase corrections 1416 change linearly for consecutive symbols). For example, the phase correction 216 for symbol 8 may be determined by subtracting the phase drift per symbol Δθ from the phase correction 216 for symbol 7 and the phase correction for symbol 9 may be determined by subtracting the phase drift per symbol Δθ from the phase correction 216 for symbol 8. In certain implementations, the phase corrections 216 may be identified by first identifying phase differences for the second subset of symbols and then determining the phase corrections 216 to be the opposite of the phase shifts. In still further embodiments, phase corrections 216 may not be identified. Instead, phase differences may be identified for the second subset of symbols and the second subset of symbols may be corrected according to the identified phase differences.

Once the phase corrections 216 are determined, the second subset of symbols may be corrected by applying the phase corrections 216 to the second subset of symbols. For example, the computing device 1402 may identify the phase corrections 216 corresponding to the second subset of symbols and may adjust the phase of the signals included in the symbols according to the corresponding phase correction 216. For example, the computing device 1402 may adjust timing information for the signals to shift the phase of the signals as indicated by the corresponding phase correction 216. The corrected second subset of symbols may then be stored in a corrected second portion 1418, which may be utilized for subsequent processing of all or part of the audio transmission 1404. For example, the corrected second portion 1418 may be used in subsequent processing to extract packets and/or data transmitted by the audio transmission 1404.

In describing the method 1500 above, examples were given that involved processing an entire audio transmission during a single execution of the method 1500. However, in practice, at least portions the method 1500 may be repeated separately for different parts of an audio transmission. For example, in addition or alternative to the preamble, the audio transmission may include one or more training sequences including expected symbols containing expected frequencies and expected phases. The method 1500 may be repeated for each of the training sequences. For example, in addition to a preamble at symbols 1-6, an audio transmission may include a training sequence halfway through the training sequence at symbols 13-18. Blocks 1504-1512 may then be repeated twice to fully process the audio transmission 1404:

(i) once with symbols 1-6 being identified as the first portion and symbols 7-12 identified as the second portion and (ii) once with symbols 13-18 identified as the first portion and symbols 19-24 identified as the second portion. Repetition of the blocks 1504-1512 may occur in sequence (e.g., the computing device 1402 may perform iteration (i) and may then perform iteration (ii)) or in parallel (e.g., the computing device 1402 may perform iterations (i) and (ii) at least in part at the same time).

Furthermore, in addition to the method 1500, the computing device 1402 may implement additional error correction and/or detection systems for different types of interference that may impact the audio transmission 1404. For example, the computing device 1402 may also include error correction and/or detection systems configured to address other types of movement of the receiver and/or transmitter (e.g., movements of the transmitter and/or receiver that occur orthogonal to an axis connecting the transmitter and receiver). To properly balance between the various error correction and/or detection systems, certain blocks of the method 1500 may be optional. For example, in certain implementations the computing device 1402 may not perform blocks 1510-1512 if the movement speed 1414 does not exceed a predetermined threshold. In such implementations, when the movement speed 1414 is below the predetermined threshold, movement of the transmitter and/or receiver may not introduce sufficient interference to justify the computational and/or processing delays of correcting the second subset of symbols. For example, the predetermined threshold may be set so that movement speeds at or above 1 inch per second are corrected according to the blocks 1510-1512.

Figure 16:
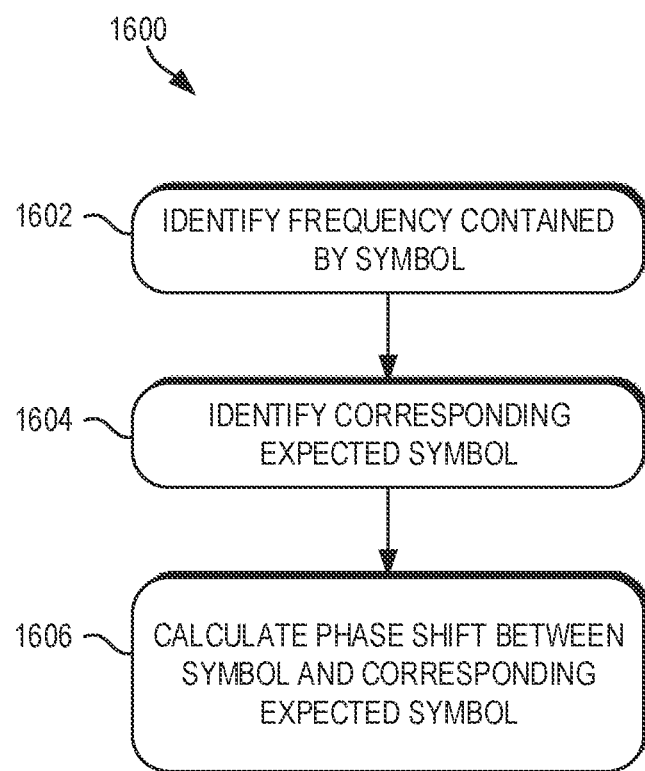
FIG. 16 illustrates a method according to exemplary embodiments of the present disclosure.

FIG. 16 illustrates a method 1600 according to exemplary embodiments of the present disclosure. The methods 1600 may be implemented on a computer system, such as the system 1400. For example, the methods 1600 may be implemented by the computing device 1402. The methods 1600 may also be implemented by a set of instructions stored on a computer readable medium that, when executed by a processor, cause the computer system to perform the method. For example, all or part of the methods 1600 may be implemented by a CPU and a memory of the computing device 1402. Although the examples below are described with reference to the flowchart illustrated in FIG. 16, many other methods of performing the acts associated with FIG. 16 may be used. For example, the order of some of the blocks may be changed, certain blocks may be combined with other blocks, one or more of the blocks may be repeated, and some of the blocks described may be optional.

The method 1600 may be performed to compare a first subset of symbols from an audio transmission to expected symbols from an expected sequence. For example, the method 1600 may be performed to at least partially implement block 1506 of the method 1500. The method 1600 may begin with identifying a phase difference of a signal contained by a symbol (block 1602). For example, the computing device 1402 may identify a phase difference of a signal contained by a symbol of the first portion 1406 of the audio transmission 1404. As explained previously, each symbol may contain a signal with a phase-shifted carrier frequency. The phase shift may be identified by comparing the phase of the signal to the phase of a first symbol of the first portion 1406 of the audio transmission 1404 (e.g., the first symbol of the preamble).

A corresponding expected symbol may then be identified (block 1604). The corresponding expected symbol may be identified from an expected sequence 1410 corresponding to the first portion 1406. The expected sequence 1410 may include expected symbols containing identical or similar phase differences to the phase differences contained by the first portion 1406 (e.g., prior to transmission of the audio transmission 1404). For example, the expected sequence 1410 may be a copy of the first portion 1406 as initially generated prior to transmission of the audio transmitter. The corresponding expected symbol may therefore be identified as they symbol from the expected symbols with a same or similar phase shift as of the symbol identified in block 1502. The same or similar phase shift may be identified as any phase shift that differs from the phase shift of the symbol by less than a predetermined threshold (e.g., 0.1 radians, 0.5 radians, 10% of the phase shift of the symbol, 20% of the phase shift of the symbol, 50% of the phase shift of the symbol) The corresponding expected symbol may additionally or alternatively be identified as the symbol from the expected symbols in the same symbol position as the symbol identified in block 1502. For example, the second symbol of the expected symbols may be identified as the corresponding symbol for the second symbol of the first portion 1406.

A phase difference may then be calculated between the symbol and the corresponding expected symbol (block 1606). For example, the computing device 1402 may calculate the phase difference between the symbol and the corresponding expected symbol. The phase difference may be calculated, as depicted in FIG. 12, as the difference in time or radians between the signal of the symbol and the signal of the corresponding expected symbol (e.g., the difference in time or radians between occurrences of one or more corresponding features of the signals, such as peaks of the signals).

The method 1600 may be repeated to process multiple symbols from the first subset of symbols. For example, the method 1600 may be performed to process each of the first subset of symbols.

Figure 17:
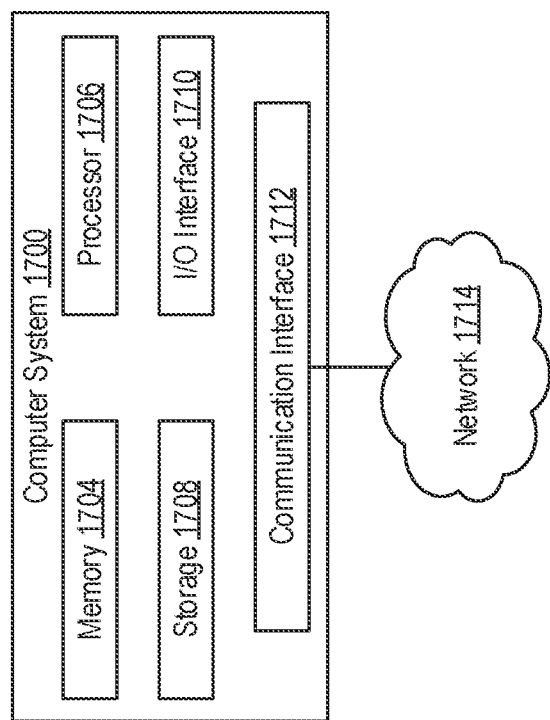
FIG. 17 illustrates a computing system according to an exemplary embodiment of the present disclosure.

FIG. 17 illustrates an example computer system 1700 that may be utilized to implement one or more of the devices and/or components discussed herein, such as the computing devices 102, 104, 302, 304, 1402. In particular embodiments, one or more computer systems 1700 perform one or more steps of one or more methods described or illustrated herein. In particular embodiments, one or more computer systems 1700 provide the functionalities described or illustrated herein. In particular embodiments, software running on one or more computer systems 1700 performs one or more steps of one or more methods described or illustrated herein or provides the functionalities described or illustrated herein. Particular embodiments include one or more portions of one or more computer systems 1700. Herein, a reference to a computer system may encompass a computing device, and vice versa, where appropriate. Moreover, a reference to a computer system may encompass one or more computer systems, where appropriate.

This disclosure contemplates any suitable number of computer systems 1700. This disclosure contemplates the computer system 1700 taking any suitable physical form. As example and not by way of limitation, the computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1706, memory 1704, storage 1708, an input/output (I/O) interface 1710, and a communication interface 1712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 1706 includes hardware for executing instructions, such as those making up a computer program. As an example and not by way of limitation, to execute instructions, the processor 1706 may retrieve (or fetch) the instructions from an internal register, an internal cache, memory 1704, or storage 1708; decode and execute the instructions; and then write one or more results to an internal register, internal cache, memory 1704, or storage 1708. In particular embodiments, the processor 1706 may include one or more internal caches for data, instructions, or addresses. This disclosure contemplates the processor 1706 including any suitable number of any suitable internal caches, where appropriate. As an example and not by way of limitation, the processor 1706 may include one or more instruction caches, one or more data caches, and one or more translation lookaside buffers (TLBs). Instructions in the instruction caches may be copies of instructions in memory 1704 or storage 1708, and the instruction caches may speed up retrieval of those instructions by the processor 1706. Data in the data caches may be copies of data in memory 1704 or storage 1708 that are to be operated on by computer instructions; the results of previous instructions executed by the processor 1706 that are accessible to subsequent instructions or for writing to memory 1704 or storage 1708; or any other suitable data. The data caches may speed up read or write operations by the processor 1706. The TLBs may speed up virtual-address translation for the processor 1706. In particular embodiments, processor 1706 may include one or more internal registers for data, instructions, or addresses. This disclosure contemplates the processor 1706 including any suitable number of any suitable internal registers, where appropriate. Where appropriate, the processor 1706 may include one or more arithmetic logic units (ALUs), be a multi-core processor, or include one or more processors 1706. Although this disclosure describes and illustrates a particular processor, this disclosure contemplates any suitable processor.

In particular embodiments, the memory 1704 includes main memory for storing instructions for the processor 1706 to execute or data for processor 1706 to operate on. As an example, and not by way of limitation, computer system 1700 may load instructions from storage 1708 or another source (such as another computer system 1700) to the memory 1704. The processor 1706 may then load the instructions from the memory 1704 to an internal register or internal cache. To execute the instructions, the processor 1706 may retrieve the instructions from the internal register or internal cache and decode them. During or after execution of the instructions, the processor 1706 may write one or more results (which may be intermediate or final results) to the internal register or internal cache. The processor 1706 may then write one or more of those results to the memory 1704. In particular embodiments, the processor 1706 executes only instructions in one or more internal registers or internal caches or in memory 1704 (as opposed to storage 1708 or elsewhere) and operates only on data in one or more internal registers or internal caches or in memory 1704 (as opposed to storage 1708 or elsewhere). One or more memory buses (which may each include an address bus and a data bus) may couple the processor 1706 to the memory 1704. The bus may include one or more memory buses, as described in further detail below. In particular embodiments, one or more memory management units (MMUs) reside between the processor 1706 and memory 1704 and facilitate accesses to the memory 1704 requested by the processor 1706. In particular embodiments, the memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory implementations, this disclosure contemplates any suitable memory implementation.

In particular embodiments, the storage 1708 includes mass storage for data or instructions. As an example and not by way of limitation, the storage 1708 may include a hard disk drive (HDD), a floppy disk drive, flash memory, an optical disc, a magneto-optical disc, magnetic tape, or a Universal Serial Bus (USB) drive or a combination of two or more of these. The storage 1708 may include removable or non-removable (or fixed) media, where appropriate. The storage 1708 may be internal or external to computer system 1700, where appropriate. In particular embodiments, the storage 1708 is non-volatile, solid-state memory. In particular embodiments, the storage 1708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1708 taking any suitable physical form. The storage 1708 may include one or more storage control units facilitating communication between processor 1706 and storage 1708, where appropriate. Where appropriate, the storage 1708 may include one or more storages 1708. Although this disclosure describes and illustrates particular storage, this disclosure contemplates any suitable storage.

In particular embodiments, the I/O Interface 1710 includes hardware, software, or both, providing one or more interfaces for communication between computer system 1700 and one or more I/O devices. The computer system 1700 may include one or more of these I/O devices, where appropriate. One or more of these I/O devices may enable communication between a person (i.e., a user) and computer system 1700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 1710 may include one or more device or software drivers enabling processor 1706 to drive one or more of these I/O devices. The I/O interface 1710 may include one or more I/O interfaces 1710, where appropriate. Although this disclosure describes and illustrates a particular I/O interface, this disclosure contemplates any suitable I/O interface or combination of I/O interfaces.

In particular embodiments, communication interface 1712 includes hardware, software, or both providing one or more interfaces for communication (such as, for example, packet-based communication) between computer system 1700 and one or more other computer systems 1700 or one or more networks 1714. As an example and not by way of limitation, communication interface 1712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 1714 and any suitable communication interface 1712 for the network 1714. As an example and not by way of limitation, the network 1714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a Bluetooth® WPAN), a WI-F1 network, a WI-MAX network, a cellular telephone network (such as, for example, a Global System for Mobile Communications (GSM) network), or any other suitable wireless network or a combination of two or more of these. Computer system 1700 may include any suitable communication interface 1712 for any of these networks, where appropriate. Communication interface 1712 may include one or more communication interfaces 1712, where appropriate. Although this disclosure describes and illustrates a particular communication interface implementations, this disclosure contemplates any suitable communication interface implementation.

The computer system 1702 may also include a bus. The bus may include hardware, software, or both and may communicatively couple the components of the computer system 1700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-PIN-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   receiving an audio transmission that contains a plurality of audio symbols;
   identifying, for each audio symbol of at least a subset of the plurality of audio symbols, a corresponding data value for the audio symbol based on a magnitude of the audio symbol and a phase of the audio symbol;
   determining a data payload of the audio transmission based on the corresponding data values; and
   transmitting, using a speaker, the audio transmission containing the data payload.

2. The method of claim 1, wherein identifying corresponding data values for at least the subset of the plurality of audio symbols includes identifying predetermined data values based on predetermined combinations of magnitudes and phases.

3. The method of claim 2, where the predetermined data values are identified according to a Quadrature Amplitude Modulation (QAM) protocol for encoding and/or decoding data values.

4. The method of claim 3, wherein the QAM protocol includes at least one of a 4-bit QAM protocol, a 5-bit QAM protocol, a 6-bit QAM protocol, a 7-bit QAM protocol, an 8-bit QAM protocol, a 9-bit QAM protocol, and a 10-bit QAM protocol.

5. The method of claim 1, further comprising, before identifying, for each audio symbol of at least a subset of the plurality of audio symbols, a corresponding data value for the audio symbol:
adjusting magnitudes of at least the subset of the plurality of audio symbols based on a predetermined portion of the audio transmission.

6. The method of claim 5, wherein adjusting the magnitudes of at least the subset of the plurality of audio symbols comprises:
detecting the predetermined portion of the audio transmission;
determining a power distribution for at least one predetermined frequency during the predetermined portion of the audio transmission;
identifying a magnitude for the at least one predetermined frequency within the power distribution; and
adjusting the magnitudes of the at least the subset of the plurality of audio symbols based on the magnitude of the at least one predetermined frequency.

7. The method of claim 1, further comprising, before identifying, for each audio symbol of at least a subset of the plurality of audio symbols, a corresponding data value for the audio symbol, adjusting timing information of at least the subset of the plurality of audio symbols based on a predetermined portion of the audio transmission.

8. The method of claim 1, further comprising, before identifying, for each audio symbol of at least a subset of the plurality of audio symbols, a corresponding data value for the audio symbol, adjusting phases of at least the subset of the plurality of audio symbols based on a predetermined portion of the audio transmission.

9. The method of claim 8, wherein adjusting the phases of at least the subset of the plurality of audio symbols comprises:
detecting the predetermined portion of the audio transmission;
comparing received phases of the predetermined portion at one or more times to expected phases of the predetermined portion at the one or more times;
determining, based on one or more differences between the phases and the expected phases, a movement speed between a transmitter of the audio transmission and a receiver of the audio transmission; and
adjusting the phases of at least the subset of the plurality of audio symbols based on the movement speed.

10. The method of claim 1, further comprising:
identifying a predetermined portion of the audio transmission in a received audio signal; and
identifying the plurality of audio symbols within the received audio signal based on a detection time of the predetermined portion.

11. The method of claim 1, wherein determining the data payload comprises sequentially combining the corresponding data values according to an order in which the audio symbols occur within the audio transmission.

12. A system comprising:
a processor; and
a memory storing instructions which, when executed by the processor, cause the processor to:
receive an audio transmission that contains a plurality of audio symbols;
identify, for each audio symbol of at least a subset of the plurality of audio symbols, a corresponding data value for the audio symbol based on a magnitude of the audio symbol and a phase of the audio symbol;
determine a data payload of the audio transmission based on the corresponding data values; and
transmit, using a speaker, the audio transmission containing the data payload.

13. The system of claim 12, wherein the instructions further cause the processor, while identifying corresponding data values for at least the subset of the plurality of audio symbols, cause the processor to:
identify predetermined data values based on predetermined combinations of magnitudes and phases.

14. The system of claim 13, where the predetermined data values are identified according to a Quadrature Amplitude Modulation (QAM) protocol for encoding and/or decoding data values.

15. The system of claim 14, wherein the QAM protocol includes at least one of a 4-bit QAM protocol, a 5-bit QAM protocol, a 6-bit QAM protocol, a 7-bit QAM protocol, an 8-bit QAM protocol, a 9-bit QAM protocol, and a 10-bit QAM protocol.

16. The system of claim 12, wherein the instructions further cause the processor, before identifying, for each audio symbol of at least a subset of the plurality of audio symbols, a corresponding data value for the audio symbol, to:
adjust magnitudes of at least the subset of the plurality of audio symbols based on a predetermined portion of the audio transmission.

17. The system of claim 16, wherein the instructions further cause the processor, while adjusting the magnitudes of at least the subset of the plurality of audio symbols, to:
detect the predetermined portion of the audio transmission;
determine a power distribution for at least one predetermined frequency during the predetermined portion of the audio transmission;
identify a magnitude for the at least one predetermined frequency within the power distribution; and
adjust the magnitudes of the at least the subset of the plurality of audio symbols based on the magnitude of the at least one predetermined frequency.

18. The system of claim 12, wherein the instructions further cause the processor, before identifying, for each audio symbol of at least a subset of the plurality of audio symbols, a corresponding data value for the audio symbol, to:
adjust timing information of at least the subset of the plurality of audio symbols based on a predetermined portion of the audio transmission.

19. The system of claim 12, wherein the instructions further cause the processor, before identifying, for each audio symbol of at least a subset of the plurality of audio symbols, a corresponding data value for the audio symbol, to:
adjust phases of at least the subset of the plurality of audio symbols based on a predetermined portion of the audio transmission.

20. The system of claim 12, wherein determining the data payload comprises sequentially combining the corresponding data values according to an order in which the audio symbols occur within the audio transmission.

\* \* \* \* \*